US012654267B2

(12) United States Patent (10) Patent No.: US 12,654,267 B2
Kondo et al. (45) Date of Patent: Jun. 16, 2026

(54) MACHINE TOOL

(71) Applicant: BROTHER KOGYO KABUSHIKI KAISHA, Nagoya (JP)

(72) Inventors: Masato Kondo, Nagoya (JP); Hiroyuki Tanaka, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 421 days.

(21) Appl. No.: 18/496,925

(22) Filed: Oct. 30, 2023

(65) Prior Publication Data

US 2025/0108466 A1 Apr. 3, 2025

(30) Foreign Application Priority Data

Sep. 28, 2023 (JP) ................................. 2023-168925

(51) Int. Cl.
*B23Q 3/155* (2006.01)
(52) U.S. Cl.
CPC ..... *B23Q 3/15526* (2013.01); *B23Q 3/15506* (2013.01); *B23Q 2003/15531* (2016.11)
(58) Field of Classification Search
CPC ............ B23Q 3/15526; B23Q 3/15506; B23Q 3/15706; B23Q 2003/15531; B23Q 2003/15537; B23Q 11/08; Y10T 483/348313
See application file for complete search history.

(56) References Cited

U.S. PATENT DOCUMENTS

2014/0171280 A1* 6/2014 Yang .................. B23Q 3/15706
483/59

FOREIGN PATENT DOCUMENTS

JP 2015123575 7/2015
JP 2017047483 3/2017

* cited by examiner

*Primary Examiner* — Christopher J. Besler
(74) *Attorney, Agent, or Firm* — JCIPRNET

(57) ABSTRACT

The machine tool includes a main shaft, a workpiece support part, a tool magazine, a moving mechanism, and an opening-closing mechanism. The main shaft holds a tool. The workpiece support part supports a workpiece processed by the tool. The tool magazine is provided on the workpiece support part and includes a tool holder supporting tools, and an openable and closable magazine cover covering a periphery of the tool holder. The moving mechanism includes a motor and moves the workpiece support part in a first direction. The opening-closing mechanism is configured to open and close the magazine cover. The opening-closing mechanism includes a first cam, and a link mechanism connected to the magazine cover. When the workpiece support part is moved by the moving mechanism, the link mechanism displaces the magazine cover from a closed state to an open state when the link mechanism abuts the first cam.

20 Claims, 17 Drawing Sheets

MACHINE TOOL

This application claims priority from Japanese Patent Application No. 2023-168925 filed on Sep. 28, 2023. The entire content of the priority application is incorporated herein by reference.

BACKGROUND ART

A known, machine tools that use tools to process workpieces are provided with a tool magazine for storing multiple tools, which change to the tool required for the processing conditions and thus improve the processing efficiency. The tool magazine of such a machine tool can be provided with a magazine cover to keep the tools stored in the tool magazine from being affected by the processing fluid supplied and the chips generated during processing (which may, for example, influence the replacement of tools or reduce the processing accuracy).

In the known machine tools, a tool magazine and a magazine cover for covering the tool magazine are provided on a table that holds the workpiece. The magazine cover is closed during processing to prevent the processing fluid and chips from entering the tool magazine, and the magazine cover is opened during tool changing. In the known machine tools, the operation of opening and closing the magazine cover is linked with the movement of the tool magazine in the front-rear direction driven by the table. Specifically, a first engaging part provided on the magazine cover and a second engaging part provided on the column supporting the main shaft engage with each other during the movement of the tool magazine driven by the table, thereby switching the magazine cover between open and closed states.

However, in the known machine tools, if the moving speed of the tool magazine driven by the table is not suppressed during the opening and closing of the magazine cover, the magazine cover may bounce or the engaging parts may be damaged. For this reason, such a machine tool has low tool changing efficiency.

SUMMARY

The disclosure provides a machine tool, which links the operation of opening and closing the magazine cover with the movement of the tool magazine driven by the workpiece support part, eliminates the need to excessively reduce the moving speed of the tool magazine, thereby the tool changing efficiency in the machine tool can be improved.

A machine tool according to an embodiment of the first aspect of the disclosure includes a main shaft, a workpiece support part, a tool magazine, a moving mechanism, and an opening-closing mechanism. The main shaft is adapted to hold a tool. The workpiece support part is adapted to support a workpiece that is processed by the tool being held on the main shaft. The tool magazine is provided on the workpiece support part and includes a tool holder adapted to support a plurality of tools, and a magazine cover covering a periphery of the tool holder and being configured to be openable and closable. The moving mechanism includes a motor and is configured to move the workpiece support part in a first direction. The opening-closing mechanism is configured to open and close the magazine cover. The opening-closing mechanism includes a first cam, and a link mechanism connected to the magazine cover. When the workpiece support part is moved by the moving mechanism, the link mechanism is configured to displace the magazine cover from a closed state to an open state when the link mechanism abuts the first cam.

According to the above embodiment, the operation of opening and closing the magazine cover is linked with the movement of the tool magazine driven by the workpiece support part, and the link mechanism connected to the magazine cover abuts the first cam during the movement of the tool magazine, thereby displacing the magazine cover from the closed state to the open state through the guidance of the first cam on the link mechanism. Thus, the moving speed and moving range of the tool magazine may be designed according to the shape and position of the first cam, which eliminates the need to excessively reduce the moving speed of the tool magazine. Accordingly, the tool changing efficiency of the machine tool in the above embodiment can be improved.

In the machine tool according to an embodiment of the second aspect of the disclosure, a position of the first cam in the first direction is overlapped with a moving range of the workpiece support part.

According to the above embodiment, the position of the first cam may be set according to the moving range of the tool magazine.

The machine tool according to an embodiment of the third aspect of the disclosure further includes a base supporting the workpiece support part. The first cam is located on the base.

According to the above embodiment, the position of the first cam may be set according to the moving range of the tool magazine.

In the machine tool according to an embodiment of the fourth aspect of the disclosure, the first direction is a front-rear direction, and the tool magazine is disposed at a rear side of the workpiece support part.

According to the above embodiment, the moving range of the tool magazine may be designed according to the position of the tool magazine.

In the machine tool according to an embodiment of the fifth aspect of the disclosure, the magazine cover includes a first cover, and the link mechanism includes a rotating link and a link arm. The rotating link includes a first contact part having a first surface and configured to abut the first cam, and the rotating link is configured to rotate by contact between the first cam and the first contact part. The link arm is connected to the rotating link and the first cover. The link arm is configured to displace the first cover to the open state by rotation of the rotating link.

According to the above embodiment, the moving range of the first cover of the magazine cover may be designed according to the linkage between the rotating link and the link arm, and the relative positions of the first cam and the first contact part.

In the machine tool according to an embodiment of the sixth aspect of the disclosure, an upper end portion of the first cover includes an inclined surface that is inclined downward in a direction approaching the workpiece support part.

According to the above embodiment, the first cover of the magazine cover may be less likely to accumulate chips.

In the machine tool according to an embodiment of the seventh aspect of the disclosure, the magazine cover further includes a second cover facing the first cover. The opening-closing mechanism further includes a second cam located on the first cover, and a second contact part having a second surface and located on the second cover. The second contact part abuts the second cam. When the first cover is displaced to the open state by the link arm, the second cover is displaced to the open state by the second cam moving in a state of abutting the second contact part.

According to the above embodiment, the moving range of the second cover of the magazine cover may be designed according to the shape and position of the second cam, and the relative positions of the second cam and the second contact part.

In the machine tool according to an embodiment of the eighth aspect of the disclosure, the opening-closing mechanism further includes a first urging part and a second urging part. The first urging part is connected to the link mechanism and urges the first cover toward the closed state. The second urging part is connected to the second cover and urges the second cover toward the closed state.

According to the above embodiment, the first cover and the second cover of the magazine cover may be easily brought into the closed state by the first urging part and the second urging part.

In the machine tool according to an embodiment of the ninth aspect of the disclosure, in the closed state of the magazine cover, an upper end of the first cover is located above the second cover.

According to the above embodiment, the magazine cover provides good protection.

In the machine tool according to an embodiment of the tenth aspect of the disclosure, an upper end portion of the second cover includes an inclined surface that is inclined downward in a direction away from the first cover.

According to the above embodiment, the second cover of the magazine cover may be less likely to accumulate chips.

In the machine tool according to an embodiment of the eleventh aspect of the disclosure, the first direction is a front-rear direction. The first cover covers at least a front and a side with respect to the tool holder, and the second cover covers at least a top and a rear with respect to the tool holder.

According to the above embodiment, the first cover and the second cover of the magazine cover may cover the tool holder provided in the tool magazine from the front and rear directions, the sides, and the top to keep out chips.

In the machine tool according to an embodiment of the twelfth aspect of the disclosure, the first cover includes a cover part covering a top of the second cam.

According to the above embodiment, the first cover of the magazine cover may cover the second cam from above to keep out chips.

In the machine tool according to an embodiment of the thirteenth aspect of the disclosure, the tool magazine further includes a support member that supports the tool holder. The opening-closing mechanism further includes a guide cam and a third contact part. The guide cam is located on the support member and guides a movement of the link arm. The third contact part has a third surface and is located on the link arm, and abuts the guide cam.

According to the above embodiment, the moving range of the first cover of the magazine cover may be designed according to the shape and position of the guide cam, and the relative positions of the guide cam and the third contact part.

In the machine tool according to an embodiment of the fourteenth aspect of the disclosure, when the first cover is displaced from the closed state to the open state, the first cover moves downward along the guide cam while maintaining an angle of the first cover.

According to the above embodiment, the moving range of the first cover may be shortened, thereby reducing the size of the structure.

In the machine tool according to an embodiment of the fifteenth aspect of the disclosure, the first contact part, the second contact part, and the third contact part are each a roller.

According to the above embodiment, the first contact part, the second contact part, and the third contact part may smoothly abut each of cam surfaces.

In the machine tool according to an embodiment of the sixteenth aspect of the disclosure, each of a first cam surface of the first cam, a second cam surface of the second cam, and a third cam surface of the guide cam is a surface facing a direction away from the workpiece support part.

According to the above embodiment, the cam surfaces of the first cam, the second cam, and the guide cam may be less likely to accumulate chips.

In the machine tool according to an embodiment of the seventeenth aspect of the disclosure, the rotating link rotates with respect to the support member about a first axis, and the second cover rotates with respect to the support member about a second axis.

According to the above embodiment, the moving directions of the first cover and the second cover of the magazine cover may be designed according to the positions of the rotating link connected to the first cover, and the second cover.

In the machine tool according to an embodiment of the eighteenth aspect of the disclosure, the workpiece support part includes a table and a rotation mechanism. The table is adapted to fix the workpiece. The rotation mechanism includes a motor and is configured to rotate the table around a rotation axis that is parallel to a horizontal direction.

According to the above embodiment, the workpiece support part may move linearly and rotate around the horizontal axis.

In the machine tool according to an embodiment of the nineteenth aspect of the disclosure, the main shaft is configured to move in a second direction orthogonal to the first direction.

According to the above embodiment, the main shaft may move linearly.

The machine tool according to an embodiment of the twentieth aspect of the disclosure further includes two columns that are spaced apart by a space in a second direction orthogonal to the first direction and support the main shaft, wherein the tool magazine is configured to pass between the two columns.

According to the above embodiment, the moving range of the tool magazine may pass through the main structure of the machine tool, allowing the size of the machine tool in the first direction to be shortened.

Based on the above, in the machine tool according to the disclosure, the operation of opening and closing the magazine cover is linked with the movement of the tool magazine driven by the workpiece support part. Thus, the moving speed and moving range of the tool magazine may be designed according to the shape and position of the first cam, which eliminates the need to excessively reduce the moving speed of the tool magazine. Accordingly, the tool changing efficiency of the machine tool in the embodiment of the disclosure can be improved.

DESCRIPTION OF THE EMBODIMENTS

Figure 1:
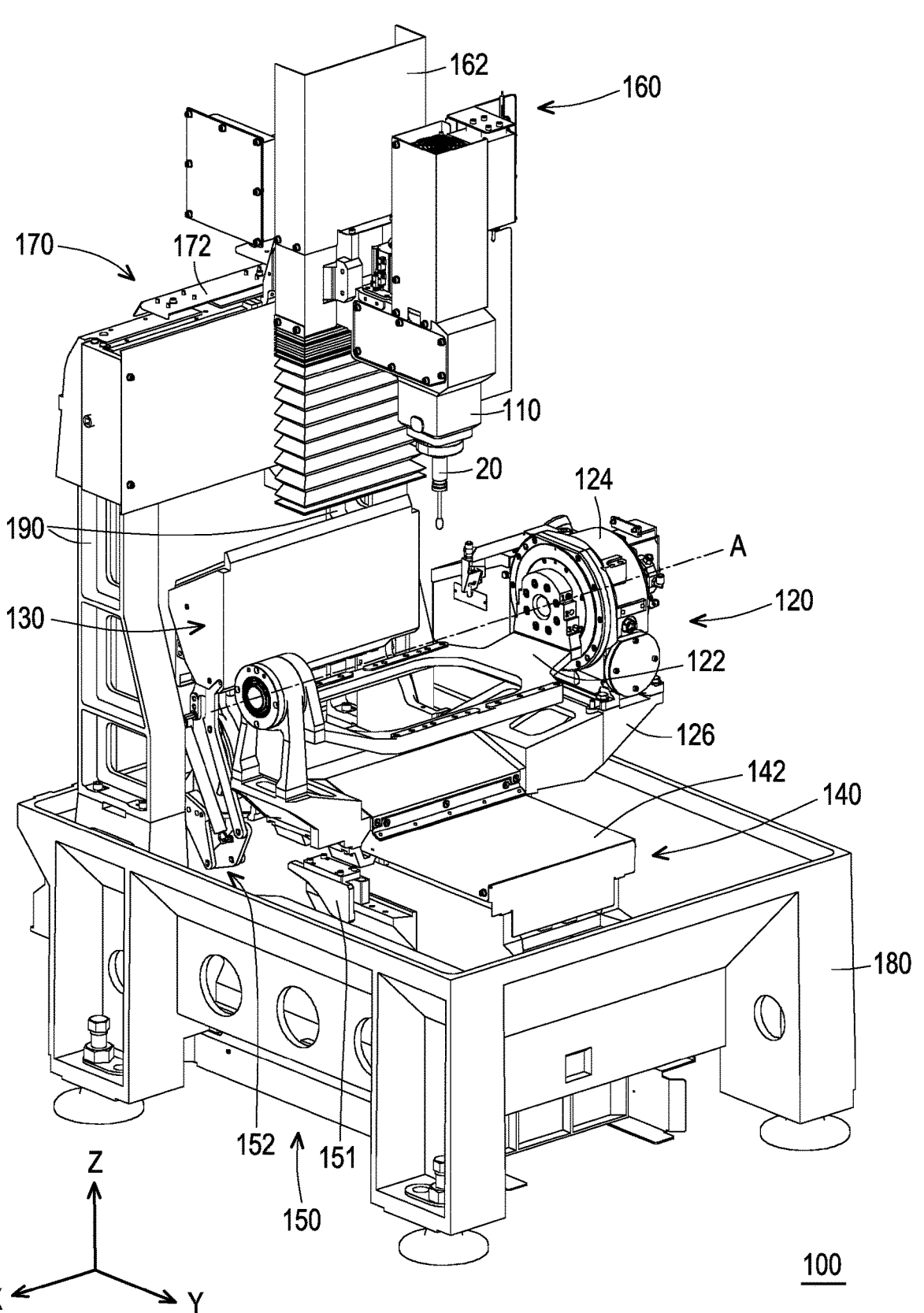
FIG. 1 is a schematic perspective view of the machine tool in the first operating state according to an embodiment of the disclosure.

Exemplary embodiments of the disclosure will be described in the accompanying drawings. The same reference numerals are used in the drawings and descriptions to refer to the same or similar parts where appropriate. The specific structure and operation flow of a machine tool 100 according to this embodiment will be described below with reference to FIG. 1 to FIG. 6. However, it should be noted that this is merely one example of the disclosure. The specific structure and operation flow of the machine tool 100 may be adjusted as required, and the disclosure is not limited thereto.

Figure 2:
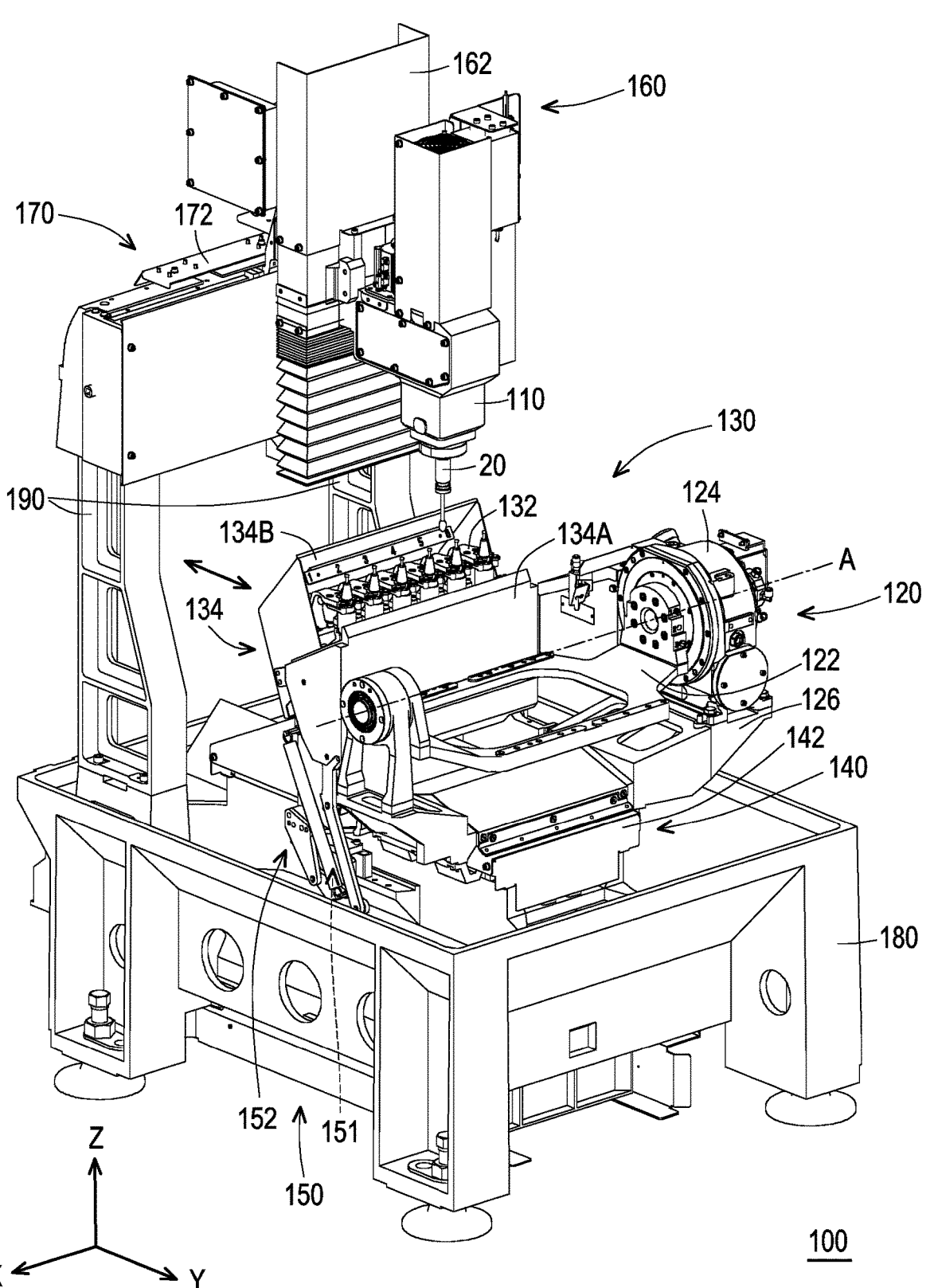
FIG. 2 is a schematic perspective view of the machine tool shown in FIG. 1 in the second operating state.
Figure 3:
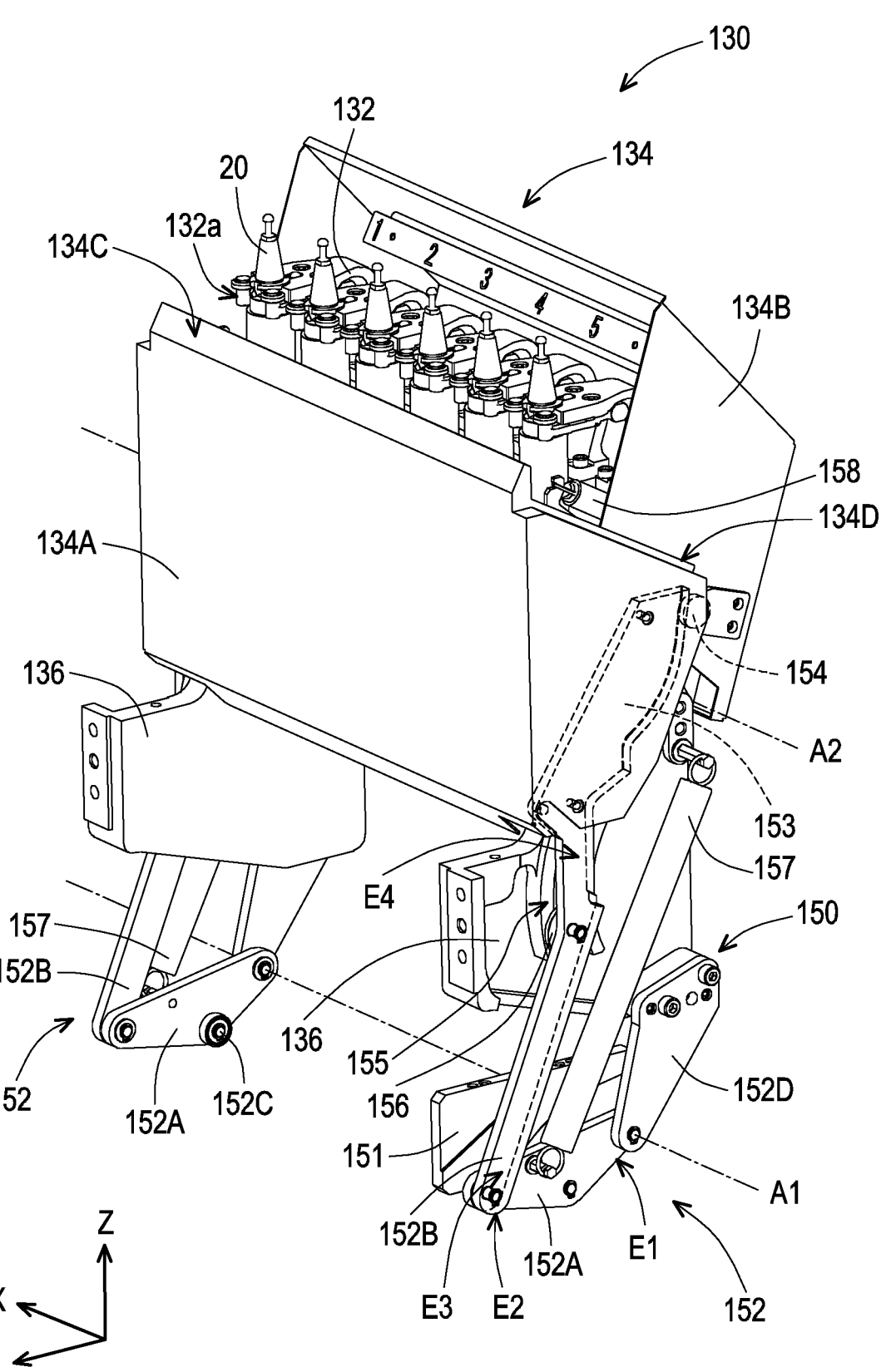
FIG. 3 is a schematic perspective view of the tool magazine of the machine tool shown in FIG. 2 when the magazine cover is in the open state.

Referring to FIG. 1 to FIG. 3, in this embodiment, the machine tool 100 includes a main shaft 110, a workpiece support part 120, a tool magazine 130, a moving mechanism 140, and an opening-closing mechanism 150. The main shaft 110 is adapted to hold a tool 20. The workpiece support part 120 is adapted to support a workpiece (not shown) to be processed by the tool 20 being held on the main shaft 110. The tool magazine 130 is provided on the workpiece support part 120. The tool magazine 130 includes a tool holder 132 for supporting multiple tools 20 (six tools are shown in FIG. 2 and FIG. 3, but not limited thereto), and a magazine cover 134 for covering the periphery of the tool holder 132. The magazine cover 134 is configured to be openable and closable. The moving mechanism 140 is configured to move the workpiece support part 120 in a first direction (for example, front-rear direction Y). The opening-closing mechanism 150 is configured to open and close the magazine cover 134. The opening-closing mechanism 150 includes a first cam 151 and a link mechanism 152. The link mechanism 152 is connected to the magazine cover 134. When the workpiece support part 120 is moved by the moving mechanism 140, the link mechanism 152 abuts the first cam 151 so as to displace the magazine cover 134 from a closed state (corresponding to the first operating state of FIG. 1) to an open state (corresponding to the second operating state of FIG. 2). Each component will be described in detail hereinafter.

Specifically, in this embodiment, as shown in FIG. 1 and FIG. 2, the workpiece support part 120 is connected to the moving mechanism 140. The moving mechanism 140 includes, for example, a movement guiding part 142 (such as a combination of a linear motion guide and a ball screw) that extends in the first direction (front-rear direction Y), and a driving part (such as a motor (not shown)) for moving the workpiece support part 120 along the movement guiding part 142, so as to move the workpiece support part 120 in the first direction (front-rear direction Y). In this way, the workpiece support part 120 is allowed to move in the processing area (for example, directly below the main shaft 110) according to the processing conditions required for the supported workpiece. Although it is illustrated here that the workpiece support part 120 is moved in the front-rear direction Y as an example of the first direction, the workpiece support part 120 may be, for example, configured to move in other directions, and the workpiece support part 120 may be further configured to move in several directions by other moving mechanisms not shown here. Furthermore, although the movement guiding part 142 and the driving part are illustrated here as an example of the moving mechanism 140, the disclosure is not intended to limit the configuration of the moving mechanism 140, which may be adjusted as required.

In this embodiment, as shown in FIG. 1 and FIG. 2, the workpiece support part 120 includes, for example, a table 122 and a rotation mechanism 124. The table 122 is adapted to fix the workpiece. The rotation mechanism 124 is configured to rotate the table 122 with a horizontal direction (for example, left-right direction X) as a rotation axis A. The rotation mechanism 124 (for example, including a driving part such as a motor (not shown)) is provided on the moving mechanism 140 through a pedestal 126, for example, and the table 122 is provided on the rotation mechanism 124. The moving mechanism 140 is enabled to move the entire workpiece support part 120, and the rotation mechanism 124 is enabled to rotate the table 122 of the workpiece support part 120, which allows the workpiece support part 120 to move linearly and rotate around the horizontal axis to provide diverse types of processing. Although it is illustrated here that the table 122 is rotated with the left-right direction X as the rotation axis A as an example of the horizontal direction, the table 122 may be rotated with other horizontal directions or vertical directions as the rotation axis. In addition, although the table 122 and the rotation mechanism 124 are illustrated here as an example of the workpiece support part 120, the workpiece support part 120 may include only the table 122. The disclosure is not intended to limit the configuration of the workpiece support part 120, which may be adjusted as required.

Furthermore, in this embodiment, as shown in FIG. 1 and FIG. 2, the tool magazine 130 stores multiple tools 20. The tool magazine 130 includes the tool holder 132 for supporting multiple tools 20, and the magazine cover 134 that covers the periphery of the tool holder 132 and is openable and closable. As an example, as shown in FIG. 3, the tool holder 132 is provided with multiple clamps 132a capable of holding the tools 20, and the openings of the clamps 132a are directed toward the front side in the front-rear direction X, allowing the tools 20 to be held by the clamps 132a and supported by the tool holder 132. The tool holder 132 of the tool magazine 130 support multiple tools 20 to be arranged in a single row in the left-right direction X. In this way, the required tool 20 may be selected through the relative movement of the main shaft 110 for holding the tool 20 and the tool magazine 130 for storing the tools 20 in the left-right direction X (as will be described later). Although it is illustrated here that six clamps 132a are provided on the tool holder 132 to support six tools 20, the number of tools 20 and clamps 132a may be adjusted as required. Moreover, the means of the tool holder 132 for supporting the tool 20 is not limited to the clamp 132a, and may be other support members capable of supporting the tool 20. Although it is illustrated here that the tool holder 132 supports multiple tools 20 to be arranged in a single row in the left-right direction X, the tool holder 132 may support multiple tools 20 to be arranged in a single row in other directions or support multiple tools 20 to be arranged in a matrix. In the disclosure, the tool magazine 130 does not necessarily support the tools 20 with the tool holder 132, which may be adjusted as required. In addition, the magazine cover 134 is closed during processing of the machine tool 100 to prevent chips or the like from adhering to the tools 20 supported by the tool holder 132. The magazine cover 134 is opened during tool changing of the machine tool 100 so as to replace the tool 20 held by the main shaft 110 with other tools 20 supported by the tool holder 132. The specific structure and opening and closing operation of the magazine cover 134 will be described later.

In this embodiment, as shown in FIG. 1 and FIG. 2, the tool magazine 130 is provided on the workpiece support part 120 and is capable of moving synchronously with the workpiece support part 120. As an example, in addition to the tool holder 132 and the magazine cover 134, the tool magazine 130 further includes a support member 136 for supporting the tool holder 132. The tool holder 132 and the magazine cover 134 are disposed on the workpiece support part 120 through the support member 136 (for example, disposed on the pedestal 126 described above). While the moving mechanism 140 moves the workpiece support part 120 in the first direction (front-rear direction Y), the tool magazine 130 also moves in the first direction (front-rear direction Y), allowing the positions of the workpiece support part 120 and the tool magazine 130 to be adjusted according to the working process of the machine tool 100. Although it is illustrated here that the tool magazine 130 is disposed on the workpiece support part 120 through the support member 136, other components may be used to dispose the tool magazine 130 on the workpiece support part 120, or the tool holder 132 of the tool magazine 130 may be directly disposed on the workpiece support part 120. The disclosure is not intended to limit how the tool magazine 130 and the workpiece support part 120 synchronously move in the first direction, which may be adjusted as required.

Furthermore, in this embodiment, the tool magazine 130 and the workpiece support part 120 are arranged in the first direction, allowing the positions of the workpiece support part 120 and the tool magazine 130 in the first direction to be adjusted according to the working process of the machine tool 100. In the case where the first direction is the front-rear direction Y, the tool magazine 130 is disposed at the rear side of the workpiece support part 120, for example. When the machine tool 100 performs the processing, the workpiece support part 120 is moved by the moving mechanism 140 to a position corresponding to the main shaft 110 (as shown in FIG. 1). Therefore, the workpiece supported on the workpiece support part 120 may be processed. When the machine tool 100 performs the tool changing, the workpiece support part 120 is moved by the moving mechanism 140 to a position forward the position in the processing process, and the tool magazine 130 is moved to a position corresponding to the main shaft 110 (as shown in FIG. 2). Accordingly, the tool changing with the tools 20 stored in the tool magazine 130 may be performed. Therefore, the workpiece support part 120 and the tool magazine 130 may be arranged adjacent to each other to shorten the moving range in the first direction and the size of the machine tool 100 in the first direction may be reduced. Accordingly, the moving range of the tool magazine 130 may be designed according to the position of the tool magazine 130 to improve the tool changing efficiency and reduce the size of the structure of the machine tool 100. Although it is illustrated here that the workpiece support part 120 and the tool magazine 130 are arranged adjacent to each other in the first direction and the tool magazine 130 is disposed at the rear side of the workpiece support part 120, the relative positions of the workpiece support part 120 and the tool magazine 130 may be adjusted as required. For example, the tool magazine 130 may be disposed either the left side or the right side of the workpiece support part 120.

In this embodiment, as shown in FIG. 1 and FIG. 2, the main shaft 110 for holding the tool 20 is disposed at the side away from the workpiece support part 120 and the tool magazine 130 in an up-down direction Z. For example, the main shaft 110 is provided above the workpiece support part 120 and the tool magazine 130 in the up-down direction Z. Besides, the main shaft 110 is movable in, for example, a second direction (for example, the up-down direction Z) orthogonal to the first direction (front-rear direction Y). As an example, the machine tool 100 further includes a first driving mechanism 160. The first driving mechanism 160 includes a first driving guiding part 162 (such as a combination of a linear motion guide and a ball screw) that extends in the up-down direction Z, and a driving part (such as a motor (not shown)) for moving the main shaft 110 along the first driving guiding part 162, which enables the main shaft 110 to be moved in the up-down direction Z. It can be seen that the main shaft 110 is capable of moving downward during processing to approach the workpiece support part 120 so as to process the workpiece supported on the workpiece support part 120 with the held tool 20. Further, the main shaft 110 is capable of moving downward during tool changing to approach the tool magazine 130 so as to exchange tools with the tools 20 stored in the tool magazine 130. The positions of the workpiece support part 120 and the tool magazine 130 in the first direction (front-rear direction Y) are adjusted through the movement of the moving mechanism 140 (as described above) so that the main shaft 110 can perform processing or change the tools according to the working process of the machine tool 100. In this way, the main shaft 110 is enabled to move linearly. Although the first driving guiding part 162 and the driving part are illustrated here as an example of the first driving mechanism 160, the disclosure is not intended to limit the configuration of the first driving mechanism 160. Furthermore, although it is illustrated here that the main shaft 110 is moved in the up-down direction Z as an example of the second direction, the disclosure is not intended to limit the direction of movement of the main shaft 110.

For example, in this embodiment, as shown in FIG. 1 and FIG. 2, the main shaft 110 for holding the tool 20 is, for example, movable in the second direction (for example, left-right direction X) that is orthogonal to the first direction (front-rear direction Y). As an example, the machine tool 100 further includes a second driving mechanism 170. The second driving mechanism 170 includes a second driving guiding part 172 (such as a combination of a linear motion guide and a ball screw) that extends in the left-right direction X, and a driving part (such as a motor (not shown)) for moving the main shaft 110 along the second driving guiding part 172, which enables the main shaft 110 to be moved in the left-right direction X. It can be seen that when the machine tool 100 performs tool changing, the main shaft 110 is moved in the left-right direction X to exchange the held tool 20 with one of the tools 20 arranged in a single row along the left-right direction X on the tool holder 132. In this way, the main shaft 110 is enabled to move linearly. Although the second driving guiding part 172 and the driving part are illustrated here as an example of the second driving mechanism 170, the disclosure is not intended to limit the configuration of the second driving mechanism 170. Furthermore, although it is illustrated here that the main shaft 110 is moved in the left-right direction X as an example of the second direction, the disclosure is not intended to limit the direction of movement of the main shaft 110. In particular, although it is illustrated here that the main shaft 110 is movable in both the up-down direction Z and the left-right direction X, the main shaft 110 may be movable in only one linear direction. In addition, although it is illustrated here that the main shaft 110 is movable, the main shaft 110 may be configured to be stationary. In that case, the processing and the tool changing are implemented by a movable workpiece support part 120 and a movable tool magazine 130. Nevertheless, the disclosure is not limited to the above-described implementation.

In this embodiment, as shown in FIG. 1 and FIG. 2, the machine tool 100 further includes a base 180, for example. The base 180 serves as the pedestal of the machine tool 100 to support the workpiece support part 120. For example, the base 180 support the workpiece support part 120 through the moving mechanism 140. Furthermore, components such as the main shaft 110 and the tool magazine 130 are supported by the base 180 as well. In this way, the above-mentioned components of the machine tool 100 are installed in the base 180 as a whole in a housing (not shown) of the machine tool 100. Moreover, the machine tool 100 may be automatically controlled through a control system (not shown) to constitute an apparatus for automatic processing. For example, the machine tool 100 is a numerical control (NC) apparatus or a computer numerical control (CNC) apparatus for performing the processing and tool changing described above in an automated manner. Although it is illustrated here that the base 180 serves as the pedestal of the machine tool 100 to support the above-mentioned components (workpiece support part 120, etc.), the base 180 may be omitted. Furthermore, although the machine tool 100 is illustrated here as an automated apparatus that includes a housing and a control system, the machine tool 100 may be an apparatus operated by a user. The disclosure is not intended to limit the specific structure of the machine tool 100 and the implementation for performing the processing and tool changing, which may also be adjusted as required.

Furthermore, in this embodiment, as shown in FIG. 1 to FIG. 3, the opening-closing mechanism 150 is configured to open and close the magazine cover 134 during the movement of the tool magazine 130. The opening-closing mechanism 150 includes a first cam 151 and a link mechanism 152. As an example, the first cam 151 is located on the base 180 of the machine tool 100. For example, the first cams 151 are provided in pairs on opposite sides of the base 180 in the left-right direction X (only one side is shown in FIG. 1). The first cam 151 is, for example, a flat plate-like structure with a cam surface. Moreover, the first cam 151 may be a separate component mounted on the base 180 or a structure integrally formed on the base 180. Furthermore, the link mechanism 152 is connected to the magazine cover 134. For example, the link mechanisms 152 are provided in pairs and connected to opposite sides of the magazine cover 134 in the left-right direction X. Accordingly, the machine tool 100 is capable to link the operation of opening and closing the magazine cover 134 with the movement of the tool magazine 130 driven by the workpiece support part 120. For example, the first cam 151 and the link mechanism 152 of the opening-closing mechanism 150 are respectively provided at a stationary position (for example, the base 180) and a movable position connected to the magazine cover 134 (for example, the magazine cover 134). The workpiece support part 120 is moved by the moving mechanism 140, causing the tool magazine 130 to move along with the workpiece support part 120, so that the link mechanism 152 connected to the magazine cover 134 and the first cam 151 on the base 180 also move relatively. When the link mechanism 152 abuts the first cam 151, the magazine cover 134 is displaced from the closed state (corresponding to the first operating state in FIG. 1) to the open state (corresponding to the second operating state in FIG. 2). In this way, the position of the first cam 151 may be set according to the moving range of the tool magazine 130. Although it is illustrated here that the first cams 151 are provided in pairs on the left and right sides of the base 180, and the link mechanisms 152 are provided in pairs and connected to the left and right sides of the magazine cover 134, the number and positions of the first cams 151 and the number and positions of the link mechanisms 152 may be adjusted as required. When the first cam 151 is configured to be stationary and the link mechanism 152 is configured to be movable along with the workpiece support part 120 and the tool magazine 130, the relative movement of the first cam 151 and the link mechanism 152 enables the operation of opening and closing the magazine cover 134.

Figure 4A:
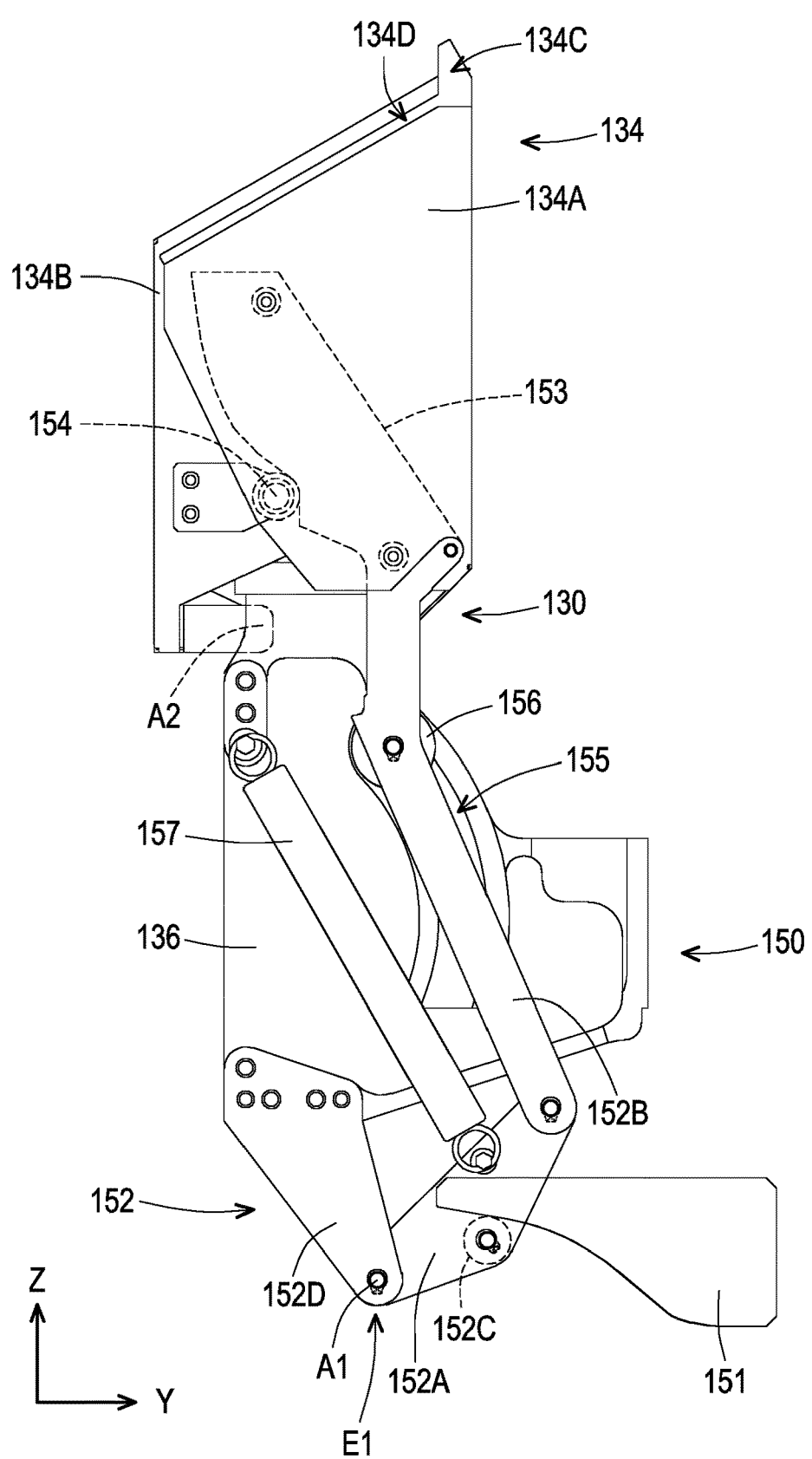
FIG. 4A to FIG. 4C are schematic side views of the tool magazine of the machine tool shown in FIG. 1 when the magazine cover is switched from the closed state to the open state, wherein the magazine cover in FIG. 4A is in the closed state, the magazine cover in FIG. 4B is in the transitional state, and the magazine cover in FIG. 4C is in the open state.
Figure 4B:
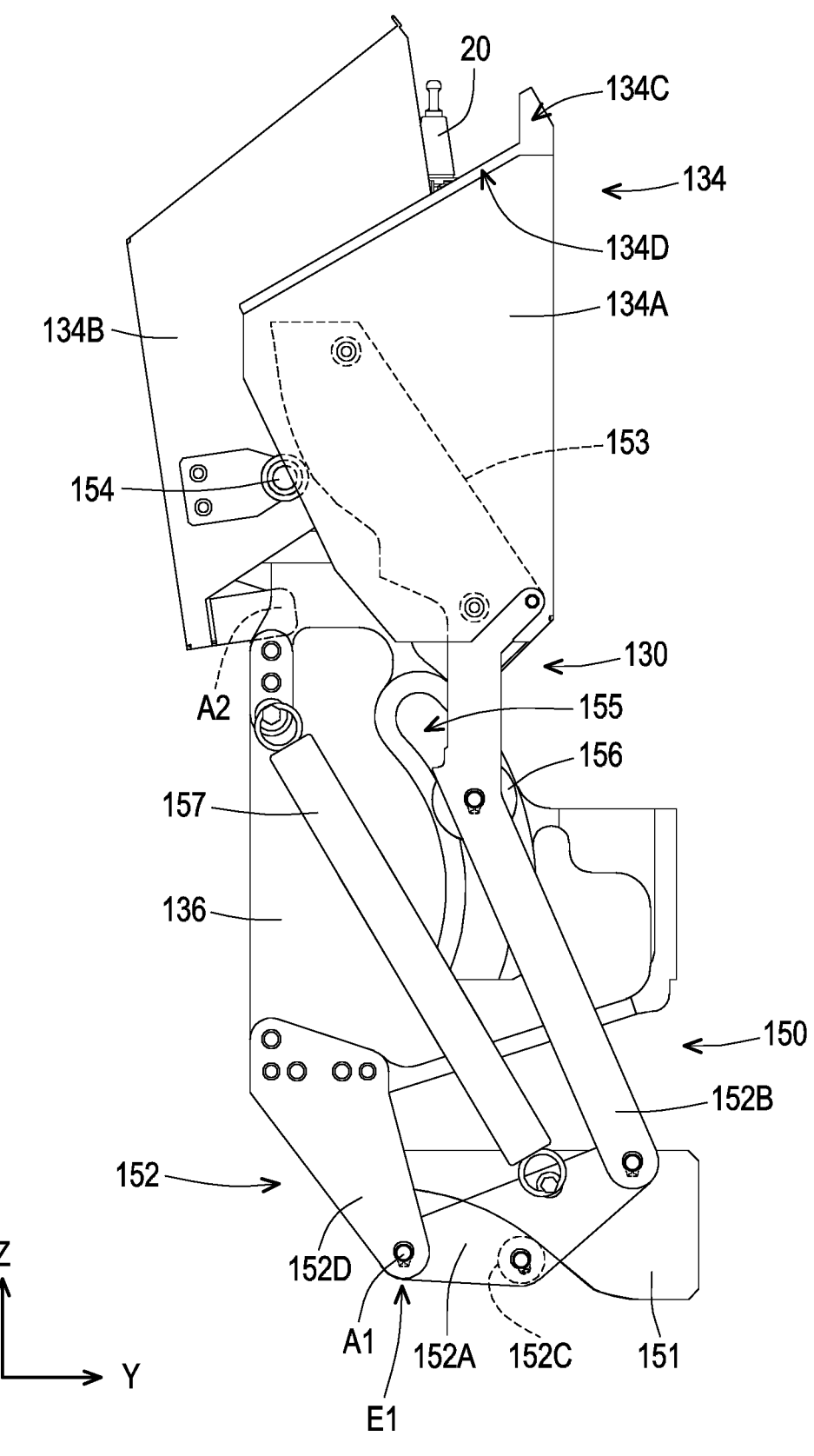
Figure 4C:
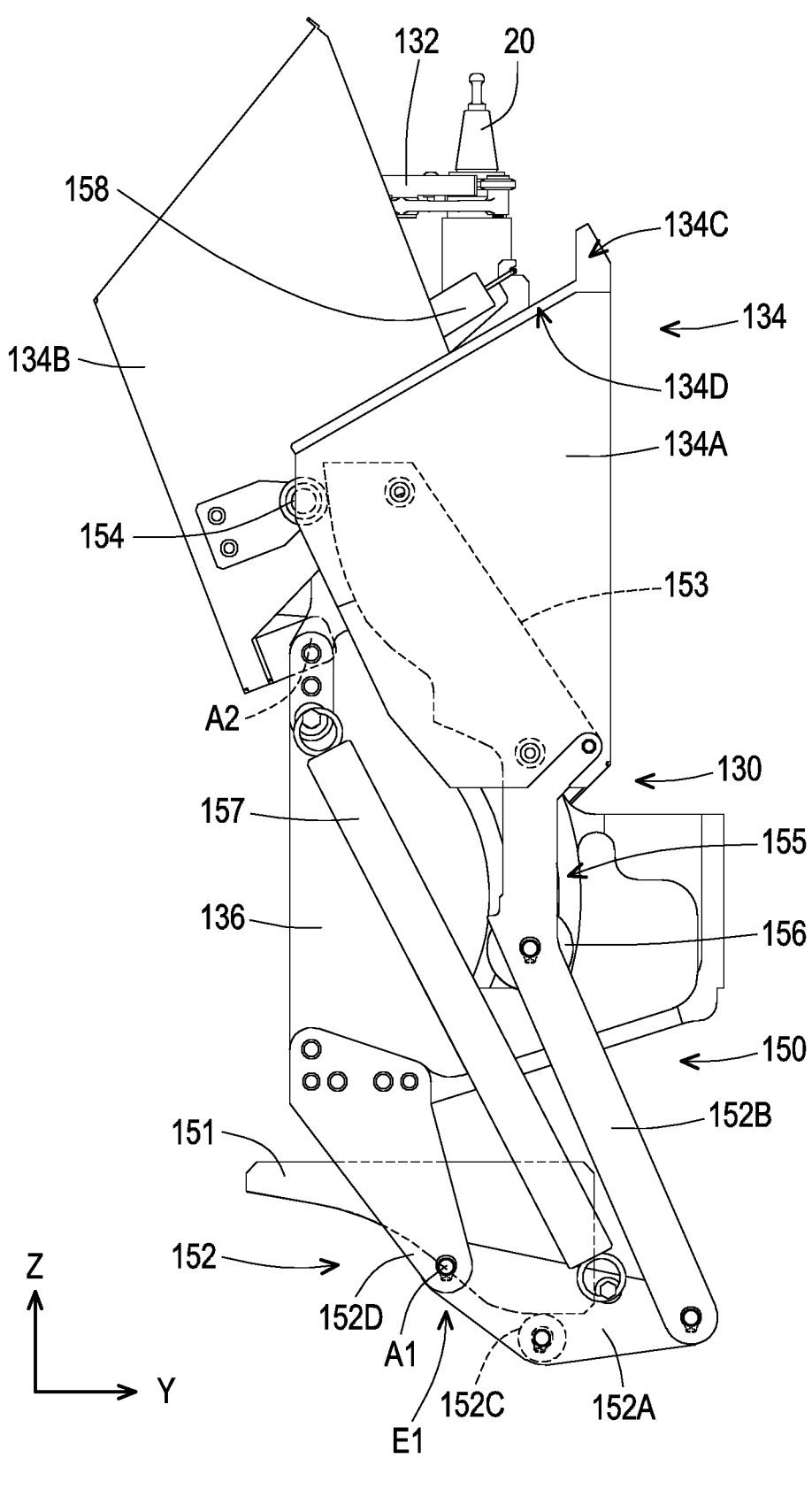

Furthermore, in this embodiment, the machine tool 100 is switched between the processing and the tool changing according to the movement of the workpiece support part 120 and the tool magazine 130 in the first direction (front-rear direction Y). Therefore, as shown in FIG. 4A to FIG. 4C, the first cam 151 and the link mechanism 152 are arranged in the first direction (front-rear direction Y), for example. During the movement of the tool magazine 130, the link mechanism 152 connected to the magazine cover 134 abuts the first cam 151 as the tool magazine 130 moves in the first direction (front-rear direction Y). Accordingly, the magazine cover 134 is displaced from the closed state in FIG. 4A to the open state in FIG. 4C through the guidance of the first cam 151 on the link mechanism 152. Further, the link mechanism 152 connected to the magazine cover 134 moves away from the first cam 151 as the tool magazine 130 moves in the first direction (front-rear direction Y), thereby displacing the magazine cover 134 from the open state in FIG. 4C to the closed state in FIG. 4A. Preferably, a position of the first cam 151 in the first direction (front-rear direction Y) is overlapped with a moving range of the workpiece support part 120. For example, the first cam 151 is overlapped with the area where the movement guiding part 142 of the moving mechanism 140 is located while seeing from the left-right direction X in FIG. 1. Therefore, the link mechanism 152 is allowed to abut the first cam 151 during the movement of the tool magazine 130 driven by the workpiece support part 120. In this way, the position of the first cam 151 may be set according to the moving range of the tool magazine 130. Moreover, the moving speed and moving range of the tool magazine 130 may be designed according to the shape and position of the first cam 151 without the need to excessively reduce the moving speed of the tool magazine 130. In particular, the state in which the link mechanism 152 abuts the first cam 151 corresponds to the operation of opening the magazine cover 134, and how the magazine cover 134 is opened (the position, direction of the magazine cover 134 in the open state) may be designed according to the shape and position of the first cam 151. Accordingly, the tool changing efficiency of the machine tool 100 can be improved. The operation of opening and closing the magazine cover 134 of the tool magazine 130 will be described in more detail below.

Specifically, in this embodiment, as shown in FIG. 3 and FIG. 4A to FIG. 4C, the magazine cover 134 includes a first cover 134A. The link mechanism 152 includes a rotating link 152A and a link arm 152B. The rotating link 152A includes a first contact part 152C configured to abut the first cam 151. The rotating link 152A is configured to rotate by contact between the first cam 151 and the first contact part 152C. The link arm 152B is connected to the rotating link 152A and the first cover 134A, and is configured to displace the first cover 134A to the open state by the rotation of the rotating link 152A. As an example, a first end E1 of the rotating link 152A is connected to the support member 136 of the tool magazine 130 through a connecting piece 152D, and a second end E2 of the rotating link 152A rotates with respect to the first end E1 about a first axis A1 (for example, corresponding to the left-right direction X). Further, a first end E3 of the link arm 152B is connected to a second end E2 of the rotating link 152A and is capable of moving corresponding to the rotation of the rotating link 152A. Moreover, a second end E4 of the link arm 152B is connected to the first cover 134A. Thus, the first cover 134A may be opened and closed by the first cam 151 and the link mechanism 152.

In this embodiment, the first contact part 152C has, for example, a structure with an arc surface, allowing the first contact part 152C to abut the first cam 151 with the arc surface as a first contact surface and move along the cam surface of the first cam 151. As an example, the first contact part 152C is a roller. For example, the first contact parts 152C are provided in pairs and respectively located on the inner side surfaces of a pair of rotating links 152A, so as to be located on opposite sides in the left-right direction X (only one side is shown in FIG. 3) in a way facing each other. The first contact part 152C may be a separate component mounted on the rotating link 152A or a structure integrally formed on the rotating link 152A. In this way, the first contact part 152C may smoothly abut the first cam 151. Accordingly, the cam surface of the first cam 151 is a surface facing a direction away from the workpiece support part 120, for example, toward the rear side and the lower side. Further, the cam surface of the first cam 151 is a curved surface extending from the rear to the front and curved from the top to the bottom. In this way, chips are less likely to accumulate on the cam surface of the first cam 151, and the first contact part 152C is allowed to move smoothly along the cam surface of the first cam 151. Although it is illustrated here that the first contact parts 152C are provided in pairs on the rotating links 152A, the number and positions of the first contact parts 152C may be adjusted as required. The link mechanism 152 may move to open and close the first cover 134A of the magazine cover 134, provided that the first contact part 152C is capable of abutting the first cam 151 as a part of the link mechanism 152.

Furthermore, in this embodiment, as shown in FIG. 4A to FIG. 4C, as the link mechanism 152 moves toward the first cam 151, the first contact part 152C abuts the cam surface of the first cam 151 and moves from the rear side to the front side and the lower side of the first cam 151. In this way, the rotating link 152A provided with the first contact part 152C rotates forward and downward about the first end E1, and the link arm 152B connected to the rotating link 152A also moves forward and downward. As a result, the first cover

134A driven by the link arm 152B moves forward and downward, and is displaced from the closed state in FIG. 4A to the open state in FIG. 4C. Further, as the link mechanism 152 moves away from the first cam 151, the first contact part 152C moves from the front side to the rear side and the upper side of the first cam 151 to be separated from the first cam 151. Thus, the rotating link 152A rotates rearward and upward about the first end E1, and the link arm 152B connected to the rotating link 152A also moves rearward and upward. As a result, the first cover 134A driven by the link arm 152B moves rearward and upward, and is displaced from the open state in FIG. 4C to the closed state in FIG. 4A. Thus, the moving range of the first cover 134A of the magazine cover 134 may be designed according to the linkage between the rotating link 152A and the link arm 152B and the relative positions of the first cam 151 and the first contact part 152C, and the moving direction of the first cover 134A of the magazine cover 134 may be designed according to the shape of the first cam 151 (for example, having the cam surface facing the rear side and the lower side), the position of the first cam 151 (for example, the cam surface is located at the front side of the first contact part 152C), or the position of the rotating link 152A connected to the first cover 134A.

In this embodiment, as shown in FIG. 3 and FIG. 4A to FIG. 4C, the magazine cover 134 further includes a second cover 134B facing the first cover 134A. The second cover 134B is mounted on the support member 136 and rotates with respect to the support member 136 about a second axis A2 (for example, corresponding to the left-right direction X). The opening-closing mechanism 150 further includes a second cam 153 and a second contact part 154. The rotation of the second cover 134B is linked with the movement of the first cover 134A through the second cam 153 and the second contact part 154. As an example, the second cam 153 is located on the first cover 134A. For example, the second cams 153 are located on opposite sides of the first cover 134A in the left-right direction X (only one side is shown in FIG. 3) in pairs. The second cam 153 is, for example, a flat plate-like structure with a cam surface. Moreover, the second cam 153 and the link arm 152B are connected, and the second cam 153 and the link arm 152B are integrally formed. Therefore, by mounting the second cam 153 on the inner side surface of the first cover 134A, the link arm 152B is also connected to the first cover 134A. However, the second cam 153 may be a separate component mounted on the first cover 134A or a structure integrally formed on the first cover 134A. Furthermore, the link arm 152B may be a separate component connectable to the second cam 153, or the link arm 152B and the second cam 153 may be located at different positions of the first cover 134A without being connected to each other. Correspondingly, the second contact part 154 abuts the second cam 153 and is located on the second cover 134B. Here, the second contact part 154 constantly abuts the second cam 153 in the operation of opening and closing the magazine cover 134. That is to say, the second contact part 154 is not separated from the second cam 153 during the movement. Thus, when the first cover 134A is displaced to the open state by the link arm 152B (as described above), the second cam 153 moves while abutting the second contact part 154, whereby the second cover 134B is displaced to the open state.

In addition, in this embodiment, the second contact part 154 has, for example, a structure with an arc surface, allowing the second contact part 154 to abut the second cam 153 with the arc surface as a second contact surface and move along the cam surface of the second cam 153. As an example, the second contact part 154 is a roller. For example, the second contact parts 154 are provided in pairs and respectively located on the inner side surfaces on opposite sides of the second cover 134B in the left-right direction X (only one side is shown in FIG. 3). The second contact part 154 may be a separate component mounted on the second cover 134B or a structure integrally formed on the second cover 134B. In this way, the second contact part 154 may smoothly abut the second cam 153. Accordingly, the cam surface of the second cam 153 is a surface facing a direction away from the workpiece support part 120, for example, toward the rear side and the lower side. Further, the cam surface of the second cam 153 is a curved surface extending from the rear to the front and curved from the top to the bottom. In this way, chips are less likely to accumulate on the cam surface of the second cam 153, and the second contact part 154 is allowed to move smoothly along the cam surface of the second cam 153. Although it is illustrated here that the second cams 153 are provided in pairs on the left and right sides of the first cover 134A, and the second contact parts 154 are provided in pairs in the left-right direction X of the second cover 134B, the number and positions of the second cams 153 and the number and positions of the second contact parts 154 may be adjusted as required. With the second cam 153 and the second contact part 154 respectively located on the first cover 134A and the second cover 134B and abutting each other, the second cover 134B may be opened and closed by the movement of the first cover 134A.

Furthermore, in this embodiment, as shown in FIG. 4A to FIG. 4C, when the first cover 134A is displaced to the open state by the link arm 152B (as described above), the link arm 152B and the first cover 134A move forward and downward, causing the second cam 153 located on the first cover 134A to move forward and downward, and the second contact part 154 abutting the second cam 153 moves to the rear side and the upper side along the cam surface of the second cam 153 (toward the rear side and the lower side). As a result, the second cover 134B is displaced from the closed state in FIG. 4A to the open state in FIG. 4C as the second contact part 154 moves rearward and upward. Further, when the first cover 134A is displaced to the closed state by the link arm 152B (as described above), the link arm 152B and the first cover 134A move rearward and upward, causing the second cam 153 located on the first cover 134A to move rearward and upward, and the second contact part 154 abutting the second cam 153 moves from the upper side to the front side and the lower side along the cam surface of the second cam 153. As a result, the second cover 134B is displaced from the open state in FIG. 4C to the closed state in FIG. 4A as the second contact part 154 moves forward and downward. Thus, the moving range of the second cover 134B of the magazine cover 134 may be designed according to the shape of the second cam 153 (for example, having the cam surface facing the rear side and the lower side), the position of the second cam 153 (for example, the cam surface is located at the front side of the second contact part 154), and the relative positions of the second cam 153 and the second contact part 154. The moving direction of the second cover 134B of the magazine cover 134 may be designed according to the position of the second cover 134B.

In this embodiment, as shown in FIG. 3 and FIG. 4A to FIG. 4C, the opening-closing mechanism 150 further includes a guide cam 155 and a third contact part 156. As an example, the guide cam 155 is located on the support member 136 of the tool magazine 130. For example, the guide cams 155 are provided in pairs on a pair of support members 136 and are located on opposite sides in the left-right direction X (only one side is shown in FIG. 3), and guide the movement of the link arm 152B. The guide cam 155 has, for example, a groove structure with a cam surface formed on the support member 136. The third contact part 156 is provided on the link arm 152B and abuts the guide cam 155. Here, the third contact part 156 constantly abuts the guide cam 155 in the operation of opening and closing the magazine cover 134. That is to say, the third contact part 156 is not separated from the guide cam 155 during the movement. In particular, the third contact part 156 may be attached to a guide groove serving as the guide cam 155 to abut the cam surface (that is, the surface close to the rear) of the guide cam 155. Thus, when the first cover 134A is displaced to the open state by the link arm 152B (as described above), the third contact part 156 moves while abutting the guide cam 155, whereby the first cover 134A is displaced to the open state.

In addition, in this embodiment, the third contact part 156 has, for example, a structure with an arc surface, allowing the third contact part 156 to abut the guide cam 155 with the arc surface as a third contact surface and move along the cam surface of the guide cam 155. As an example, the third contact part 156 is a roller. For example, the third contact parts 156 are provided in pairs and respectively located on the inner side surfaces of a pair of link arms 152B, so as to be located on opposite sides in the left-right direction X in a way facing each other. The third contact part 156 may be a separate component mounted on the link arm 152B or a structure integrally formed on the link arm 152B. In this way, the third contact part 156 may smoothly abut the guide cam 155. Accordingly, the cam surface of the guide cam 155 is a surface facing a direction away from the workpiece support part 120, for example, toward the rear side and the lower side. Further, the cam surface of the guide cam 155 is a curved surface extending from the top to the bottom and curved forward. In this way, chips are less likely to accumulate on the cam surface of the guide cam 155, and the third contact part 156 is allowed to move smoothly along the cam surface of the guide cam 155. Although it is illustrated here that the guide cams 155 are provided in pairs on the support members 136 and the third contact parts 156 are provided in pairs on the inner side surfaces of the link arms 152B, the number and positions of the guide cams 155 and the number and positions of the third contact parts 156 may be adjusted as required. With the guide cam 155 and the third contact part 156 respectively located on the support member 136 and the link arm 152B and abutting each other, the relative movement of the guide cam 155 and the third contact part 156 may guide the movement of the first cover 134A.

Furthermore, in this embodiment, as shown in FIG. 4A to FIG. 4C, when the first cover 134A is displaced to the open state by the link arm 152B (as described above), the link arm 152B moves forward and downward, causing the third contact part 156 located on the link arm 152B and abutting the guide cam 155 to move from the upper side to the lower side along the cam surface of the guide cam 155. As a result, the first cover 134A is displaced from the closed state in FIG. 4A to the open state in FIG. 4C. Further, when the first cover 134A is displaced to the closed state by the link arm 152B (as described above), the link arm 152B moves rearward and upward, causing the third contact part 156 located on the link arm 152B and abutting the guide cam 155 to move from the lower side to the upper side along the cam surface of the guide cam 155. As a result, the first cover 134A is displaced from the open state in FIG. 4C to the closed state in FIG. 4A. Thus, the moving range of the first cover 134A of the magazine cover 134 may be designed according to the shape of the guide cam 155 (for example, having the cam surface facing the rear side and the lower side), the position of the guide cam 155 (for example, the cam surface is located at the front side of the third contact part 156), and the relative positions of the guide cam 155 and the third contact part 156. In particular, when the first cover 134A is displaced from the closed state in FIG. 4A to the open state in FIG. 4C, the first cover 134A moves downward along the guide cam 155 while maintaining the angle of the first cover 134A (for example, the front surface of the first cover 134A is parallel to the up-down direction Z). That is, the first cover 134A does not tilt in the front-rear direction Y. This configuration shortens the moving range of the first cover 134A and reduces the size of the structure. However, the disclosure is not intended to limit any change in the angle of the first cover 134A, which may be adjusted as required.

Although it is illustrated here that the opening-closing mechanism 150 includes the first cam 151, the link mechanism 152, the second cam 153, the second contact part 154, the guide cam 155, and the third contact part 156 as an example, the guide cam 155 and the third contact part 156 may be omitted, and other guide means may be used to guide the movement of the first cover 134A. Furthermore, the second cam 153 and the second contact part 154 may be omitted, and other linkage means may be used to link the operation of opening and closing the second cover 134B with the operation of opening and closing the first cover 134A. Furthermore, although it is illustrated here that the link mechanism 152 includes the rotating link 152A, the link arm 152B, the first contact part 152C, etc., the specific configuration thereof may be adjusted as required. Besides, the above-mentioned operation for opening and closing the first cover 134A and the second cover 134B through the movement of the tool magazine 130 and the guidance of the opening-closing mechanism 150 is merely one example of the disclosure. For example, the first cover 134A and the second cover 134B are not necessarily opened in the front-rear direction Y during the movement of the tool magazine 130. The disclosure is not intended to limit the specific configuration and operation of the opening-closing mechanism 150, which may be adjusted as required, provided that the operation of opening and closing the first cover 134A and the second cover 134B is linked with the movement of the tool magazine 130 and is performed by contact between the first cam 151 of the opening-closing mechanism 150 and the link mechanism 152.

In this embodiment, as shown in FIG. 3 and FIG. 4A to FIG. 4C, the opening-closing mechanism 150 further includes a first urging part 157. The first urging part 157 is connected to the link mechanism 152 and urges the first cover 134A toward the closed state. As an example, the first urging part 157 is, for example, a tension spring, one end of which is connected to the rotating link 152A and the other end of which is connected to the support member 136 of the tool magazine 130. When the first cover 134A is displaced from the closed state in FIG. 4A to the open state in FIG. 4C, the first urging part 157 stretches and accumulates elastic force through the movement of the rotating link 152A of the link mechanism 152 with respect to the support member 136. When the first cover 134A is displaced from the open state in FIG. 4C to the closed state in FIG. 4A, the first urging part 157 contracts and releases the elastic force to assist the movement of the rotating link 152A. In this way, the first cover 134A of the magazine cover 134 may be easily brought into the closed state by the first urging part 157. That is, the first cover 134A displaced to the open state may be easily returned to the closed state. Although it is illustrated here that the first urging part 157 is connected to the rotating link 152A of the link mechanism 152, the first urging part 157 may be connected to other components of the link mechanism 152 or the first cover 134A. Although it is illustrated here that the first urging part 157 is connected to the support member 136, the first urging part 157 may be connected to other components of the tool magazine 130, provided that the opposite ends of the first urging part 157 are respectively connected to a fixed structure on the tool magazine 130 and the first cover 134A or the link mechanism 152. The disclosure is not intended to limit the first urging part 157 to a certain type or position or how the first urging part 157 is connected, which may be adjusted as required. Alternatively, the first urging part 157 may be omitted.

Similarly, in this embodiment, as shown in FIG. 3 and FIG. 4A to FIG. 4C, the opening-closing mechanism 150 further includes a second urging part 158. The second urging part 158 is connected to the second cover 134B and urges the second cover 134B toward the closed state. As an example, the second urging part 158 is, for example, a tension spring, one end of which is connected to the second cover 134B and the other end of which is connected to the tool holder 132 of the tool magazine 130. When the second cover 134B is displaced from the closed state in FIG. 4A to the open state in FIG. 4C, the second urging part 158 stretches and accumulates elastic force through the movement of the second cover 134B with respect to the tool holder 132. When the second cover 134B is displaced from the open state in FIG. 4C to the closed state in FIG. 4A, the second urging part 158 contracts and releases the elastic force to assist the movement of the second cover 134B. In this way, the second cover 134B of the magazine cover 134 may be easily brought into the closed state by the second urging part 158. That is, the second cover 134B displaced to the open state may be easily returned to the closed state. Although it is illustrated here that the second urging part 158 is connected to the tool holder 132, the second urging part 158 may be connected to other components of the tool magazine 130, provided that the opposite ends of the second urging part 158 are respectively connected to a fixed structure on the tool magazine 130 and the second cover 134B. The disclosure is not intended to limit the second urging part 158 to a certain type or position or how the second urging part 158 is connected, which may be adjusted as required. Alternatively, the second urging part 158 may be omitted.

Next, the specific structures of the first cover 134A and the second cover 134B of the magazine cover 134 will be described below. In this embodiment, as shown in FIG. 3 and FIG. 4A to FIG. 4C, in the case where the first direction of the workpiece support part 120 is the front-rear direction Y, the first cover 134A and the second cover 134B are, for example, a front cover and a rear cover arranged in the front-rear direction Y. The first cover 134A covers at least the front and the sides with respect to the tool holder 132, and the second cover 134B covers at least the top and the rear with respect to the tool holder 132. As an example, the first cover 134A is configured as a cover that has a front surface and a pair of left and right side surfaces, and the second cover 134B is configured as a cover that has a top surface and a rear surface. For example, the second cover 134B also has a pair of left and right side surfaces, and the side surfaces of the second cover 134B are located inside the side surfaces of the first cover 134A and overlap the side surfaces of the first cover 134A in the left-right direction X. For example, the link arm 152B of the link mechanism 152 is connected to the side surface of the first cover 134A, the second cam 153 is located on the side surface of the first cover 134A, and the second contact part 154 is located on the side surface of the second cover 134B, which allows the first cover 134A and the second cover 134B of the magazine cover 134 to cover the tool holder 132 provided in the tool magazine 130 from the front and rear directions, the sides (left and right directions), and the top and keep out chips. When the first cover 134A and the second cover 134B are displaced to the open state, at least parts (for example, upper end portions) of the first cover 134A and the second cover 134B are separated from each other to form an opening above for exposing the tools 20 supported by the tool holder 132, but the front and rear directions and the sides of the magazine cover 134 are still covered by the front surface of the first cover 134A, the rear surface of the second cover 134B, and the overlapping side surfaces of the first cover 134A and the second cover 134B. Further, when the first cover 134A and the second cover 134B are displaced to the closed state, at least parts (for example, upper end portions) of the first cover 134A and the second cover 134B approach each other so as to cover the tools 20 supported by the tool holder 132.

As an example, in this embodiment, the upper end of the first cover 134A is located above the second cover 134B in the closed state of the magazine cover (as shown in FIG. 4A). For example, the upper end of the front surface of the first cover 134A is bent rearward to form a bent part 134C, and the bent part 134C of the upper end of the first cover 134A is located above the second cover 134B to cover the gap between the first cover 134A and the second cover 134B in the closed state. The first cover 134A further includes a cover part 134D covering the top of the second cam 153. For example, as shown in FIG. 3, the upper end of the side surface of the first cover 134A is bent inward to form a cover part 134D, and the cover part 134D of the first cover 134A covers the top of the second cam 153 located on the inner side surface of the first cover 134A. In this way, the first cover 134A of the magazine cover 134 covers the second cam 153 from above to keep out chips. In addition, the upper end portion (for example, the bent part 134C) of the first cover 134A has an inclined surface that is inclined downward in a direction approaching the workpiece support part 120 (for example, forward). Correspondingly, the upper end portion (for example, at least the upper half of the top surface) of the second cover 134B has an inclined surface that is inclined downward in a direction away from the first cover 134A (for example, rearward). Thus, the chips falling onto the magazine cover 134 during the processing tend to fall along the inclined surfaces toward the front side of the first cover 134A and the rear side of the second cover 134B, thereby preventing the first cover 134A and the second cover 134B of the magazine cover 134 from accumulating chips easily. In particular, when the magazine cover 134 is displaced from the closed state to the open state, the first cover 134A moves in a direction approaching the workpiece support part 120 (for example, forward), and the second cover 134B moves in a direction away from the first cover 134A (for example, rearward). Therefore, even if there are chips falling onto the first cover 134A and the second cover 134B during the processing, the inclination directions of the inclined surfaces set corresponding to the moving directions of the first cover 134A and the second cover 134B may keep the chips from entering the magazine cover 134 through the opening between the first cover 134A and the second cover 134B during the tool changing. In this way, the magazine cover 134 provides good protection.

Although it is illustrated here that the magazine cover 134 includes the first cover 134A as the front cover and the second cover 134B as the rear cover, the first cover 134A and the second cover 134B may be covers arranged in other directions, provided that the operation of opening and closing the first cover 134A and the second cover 134B is linked with the movement of the tool magazine 130 driven by the workpiece support part 120 and the magazine cover 134 covers the tool holder 132 provided in the tool magazine 130 from the front and rear directions, the sides (left and right directions), and the top to keep out chips. Further, although it is illustrated here that the magazine cover 134 includes the first cover 134A and the second cover 134B that are movable relatively to form an opening, the magazine cover 134 may include only the first cover 134A which is configured as a cover structure with a front surface, a rear surface, a top surface, side surfaces, etc. to cover the tool holder 132 provided in the tool magazine 130 from the front and rear directions, the sides (left and right directions), and the top, and the cover structure may expose the tools 20 supported on the tool holder 132 through rotation. The disclosure is not intended to limit the specific structure and operation of the magazine cover 134, which may be adjusted as required, provided that the magazine cover 134 covers the periphery of the tool holder 132 and is enabled to be opened and closed by the opening-closing mechanism 150 in the process of moving the tool magazine 130.

It can be seen from the above descriptions that the magazine cover 134 of the tool magazine 130 is enabled to be opened and closed during the movement of the tool magazine 130 driven by the workpiece support part 120, which allows the machine tool 100 to set the magazine cover 134 to the closed state (corresponding to the first operating state of FIG. 1) during processing and set the magazine cover 134 to the open state (corresponding to the second operating state of FIG. 2) during tool changing. As an example, FIG. 5A to FIG. 5J are schematic views showing the operation of detaching the tool 20 on the main shaft 110 and attaching the tool 20 in the tool magazine 130 to the main shaft 110 during tool changing of the machine tool 100. First, in FIG. 5A, the machine tool 100 has completed the processing, and the main shaft 110 is moved upward in the up-down direction Z, as the second direction, by the first driving mechanism 160, so that the main shaft 110 is separated from the workpiece support part 120. Next, in FIG. 5B, the workpiece support part 120 is moved forward in the front-rear direction Y, as the first direction, by the moving mechanism 140, so that the tool magazine 130 located at the rear side of the workpiece support part 120 is moved forward toward a predetermined position and directly below the main shaft 110 for changing the tool. Meanwhile, the magazine cover 134 is displaced from the closed state to the open state and exposes the tools 20 supported on the tool holder 132 as the tool magazine 130 moves.

Figure 5A:
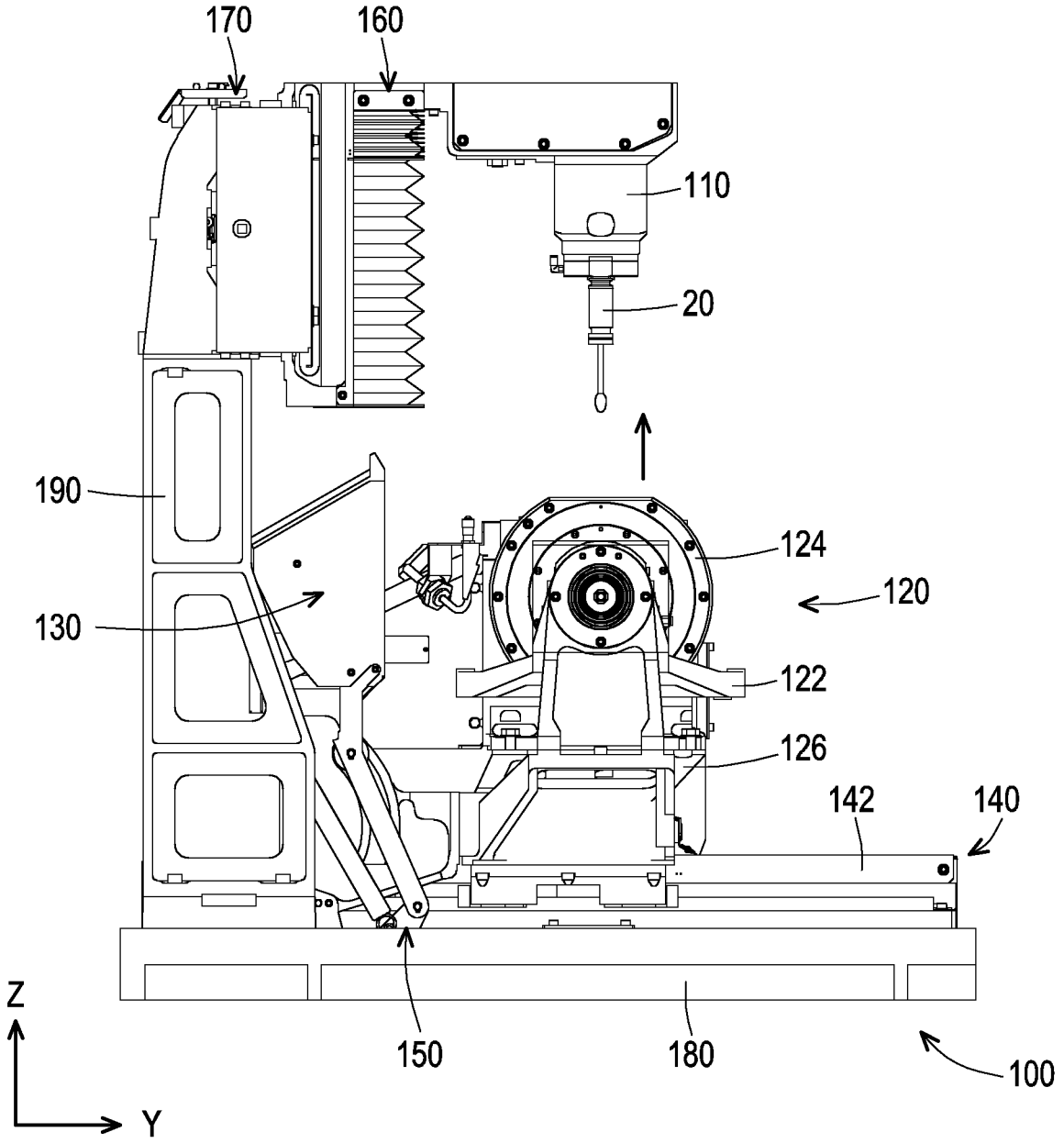
FIG. 5A to FIG. 5J are schematic views showing the operation of detaching the tool on the main shaft and attaching the tool in the tool magazine to the main shaft during tool changing of the machine tool shown in FIG. 1, wherein the tool in FIG. 5E has been detached from the main shaft, the main shaft in FIG. 5G has a tool attached, and the main shaft in FIG. 5J has the tool changed.
Figure 5B:
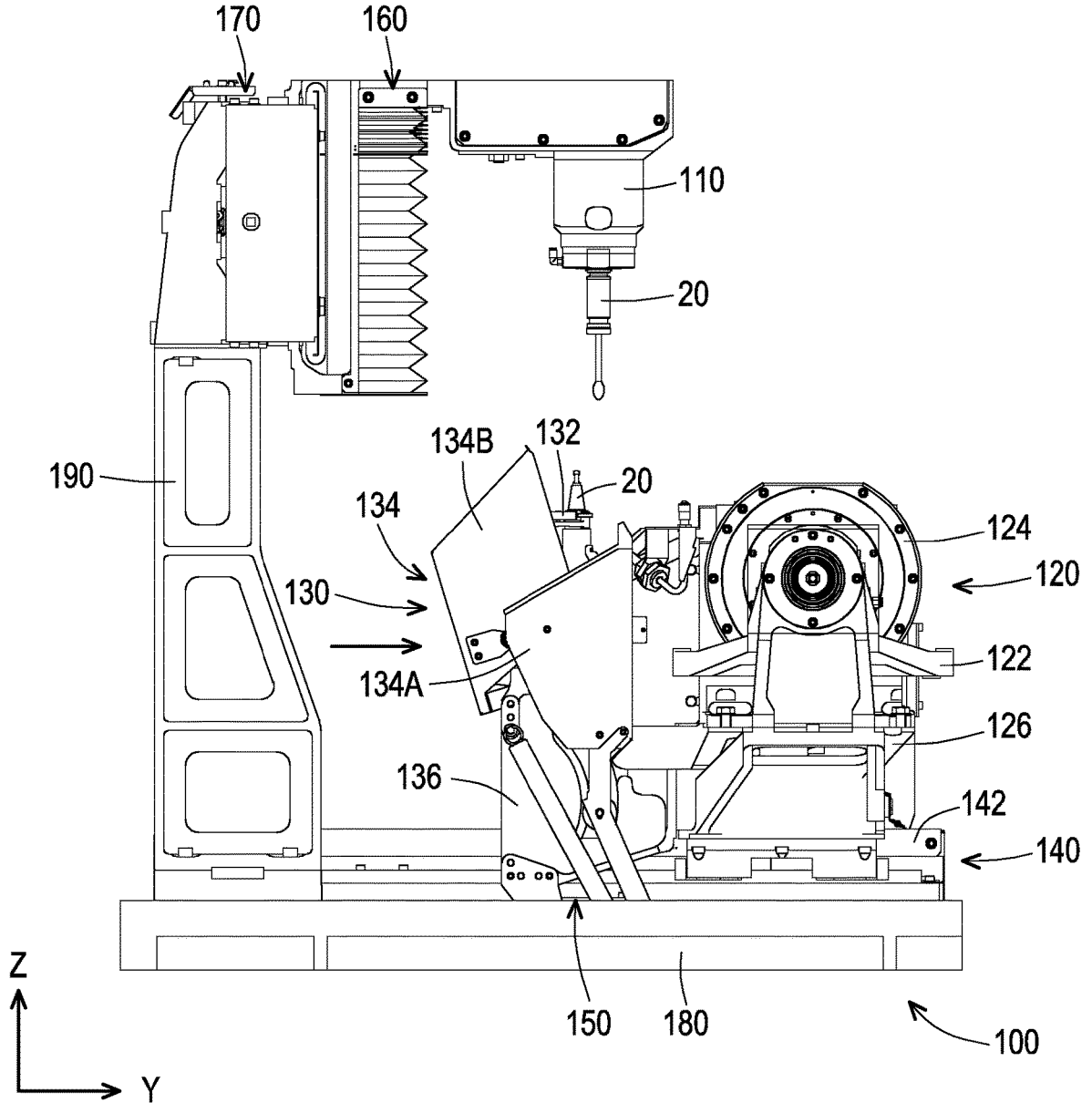
Figure 5C:
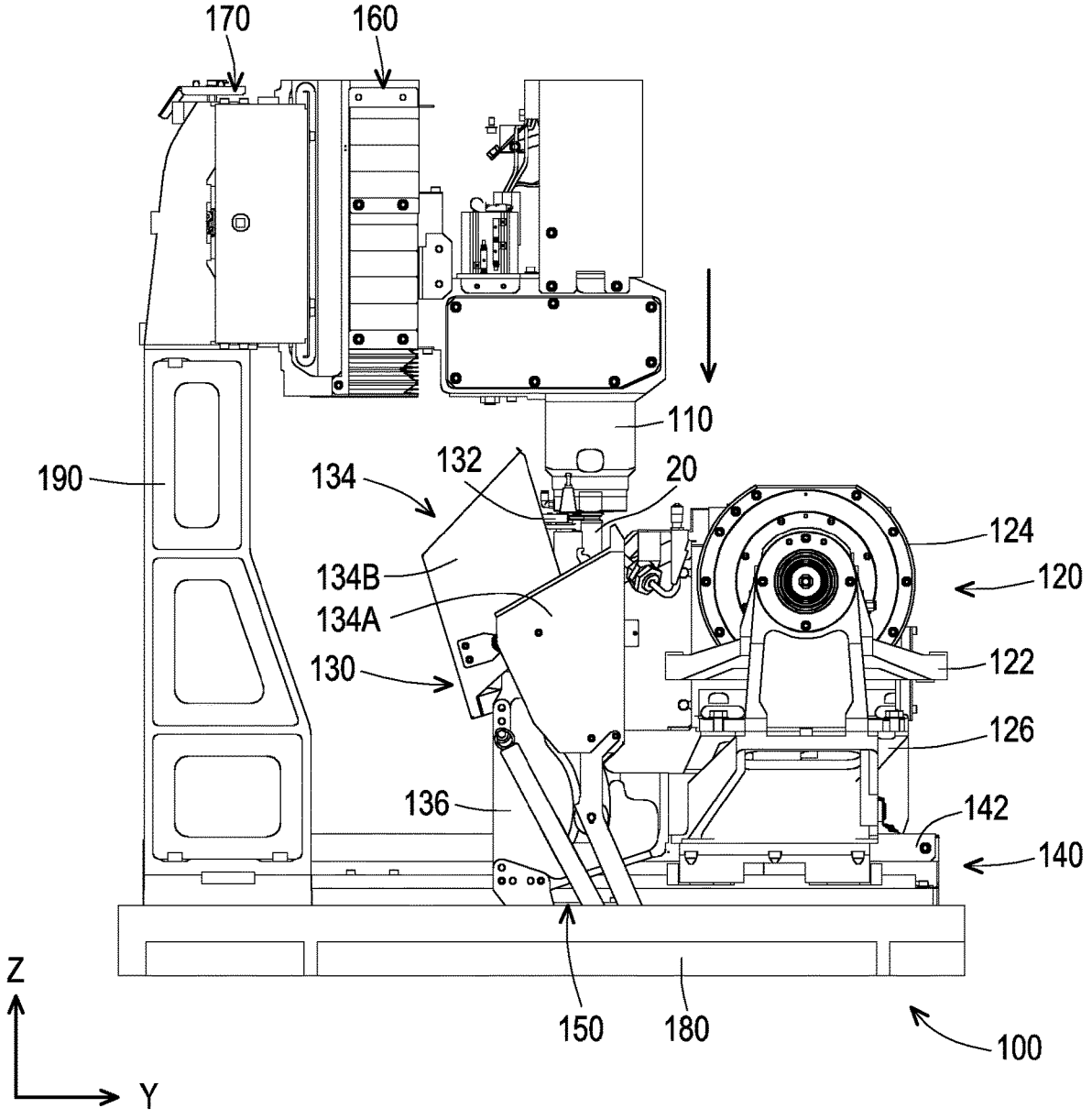
Figure 5D:
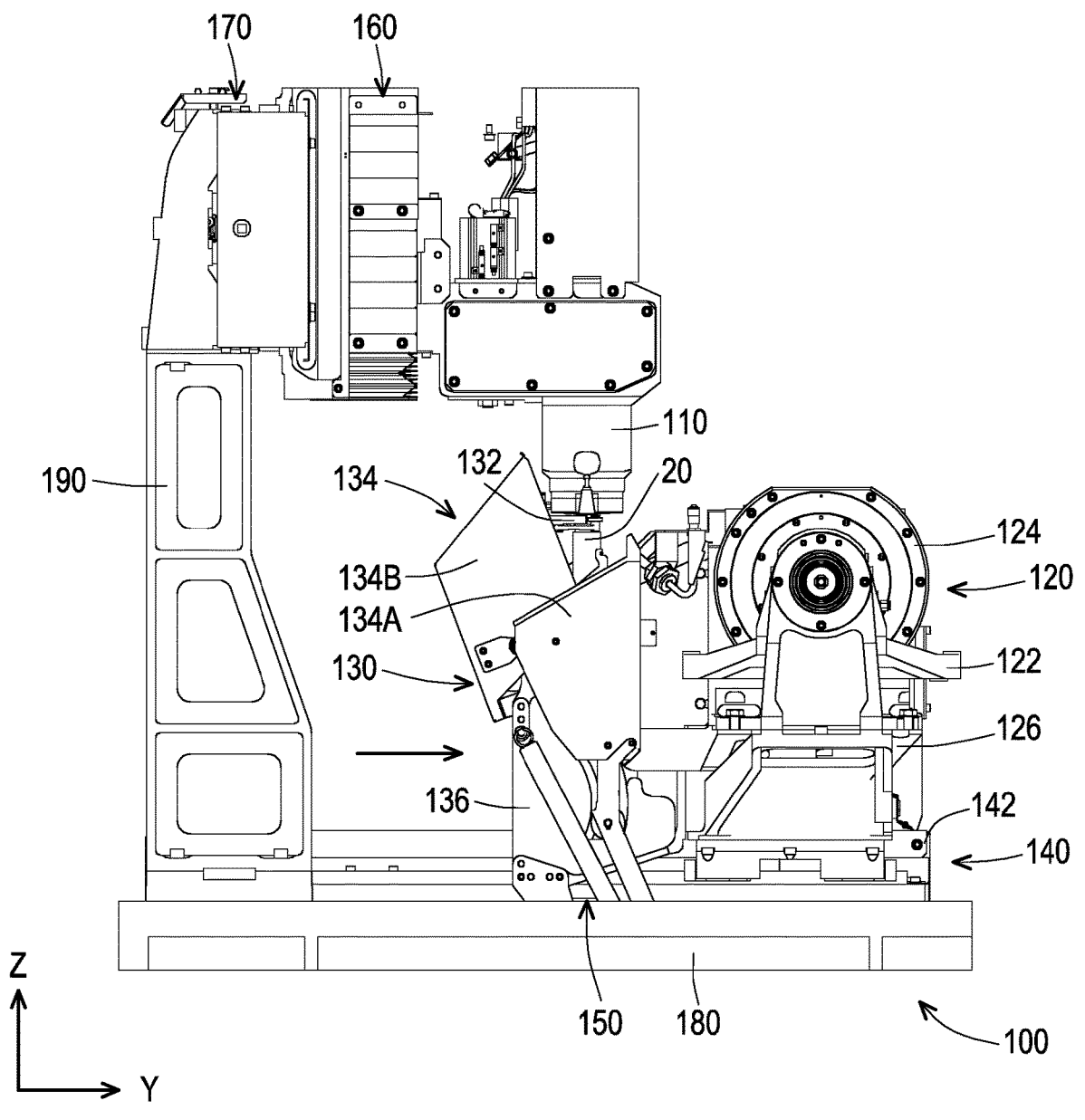
Figure 5E:
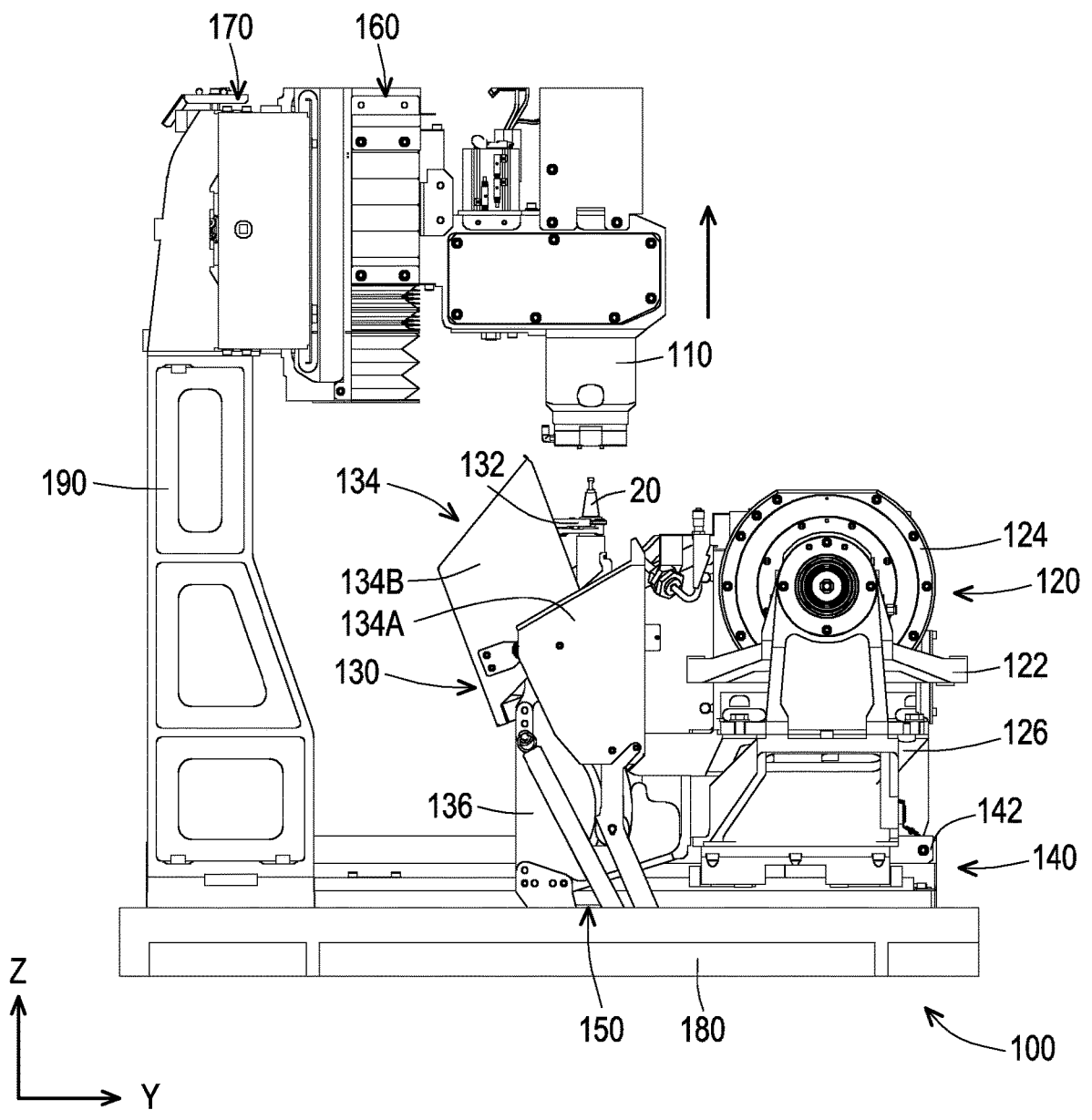
Figure 5F:
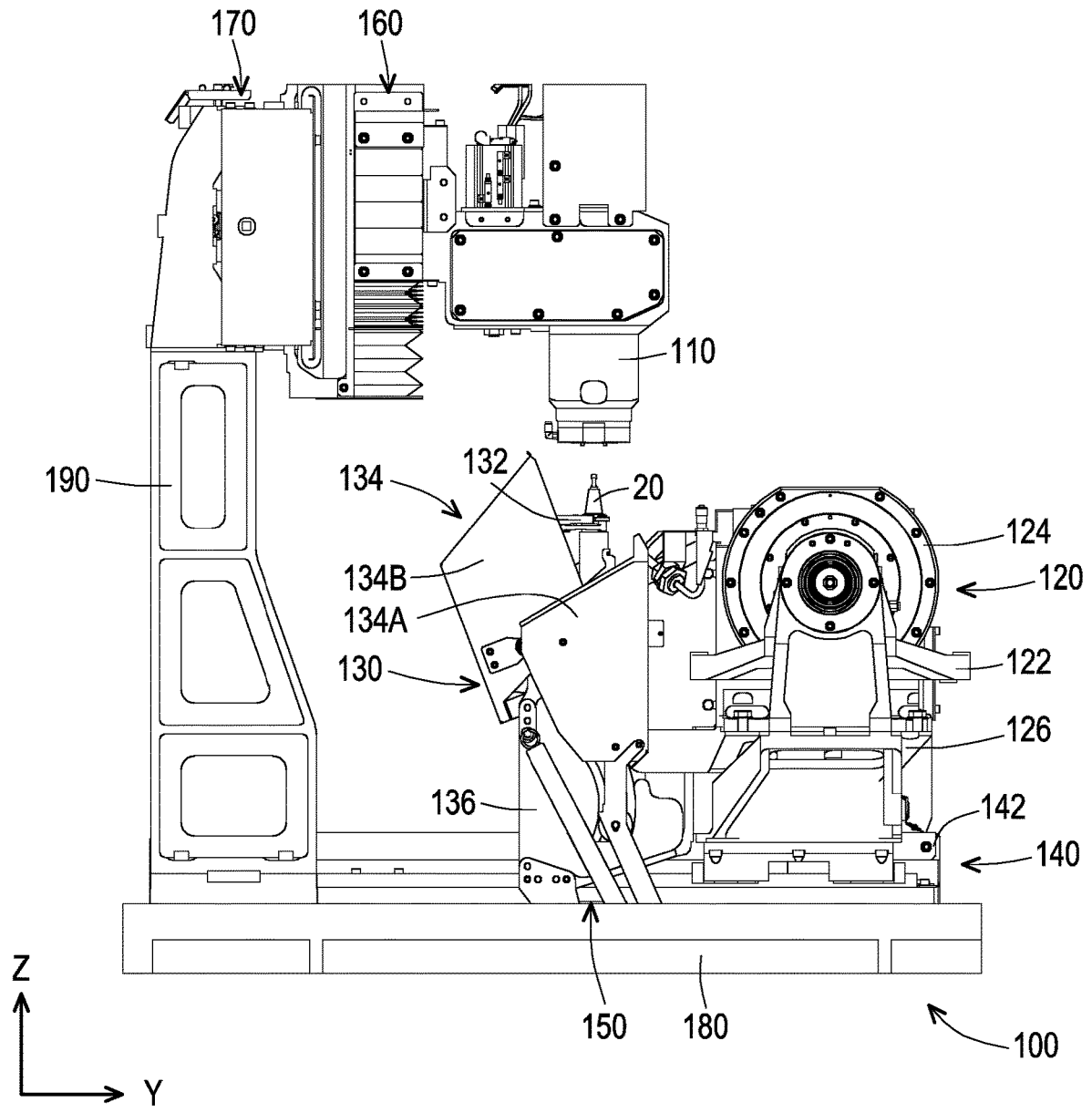

Then, in FIG. 5C, the main shaft 110 is moved downward in the up-down direction Z, as the second direction, by the first driving mechanism 160 to approach the tool holder 132, so that the tool 20 held by the main shaft 110 is positioned in front of the tool holder 132. The positions of the tool 20 held by the main shaft 110 and the tool holder 132 in the front-rear direction Y are determined in the step of FIG. 5B. Next, in FIG. 5D, the workpiece support part 120 is moved forward in the front-rear direction Y, as the first direction, by the moving mechanism 140, so that the tool 20 held by the main shaft 110 enters the front opening of the clamp 132a of the tool holder 132 from the front side of the tool holder 132 for the tool 20 to be held by the clamp 132a and supported by the tool holder 132. Next, in FIG. 5E, the main shaft 110 releases the held tool 20 and is moved upward in the up-down direction Z, as the second direction, by the first driving mechanism 160 to leave the tool holder 132, leaving the released tool 20 detached from the main shaft 110 and remaining on the tool holder 132. Then, in FIG. 5F, the main shaft 110 is moved to the position of the next tool 20 in the left-right direction X, as the second direction, by the second driving mechanism 170, so that the main shaft 110 is positioned directly above the next tool 20.

Figure 5G:
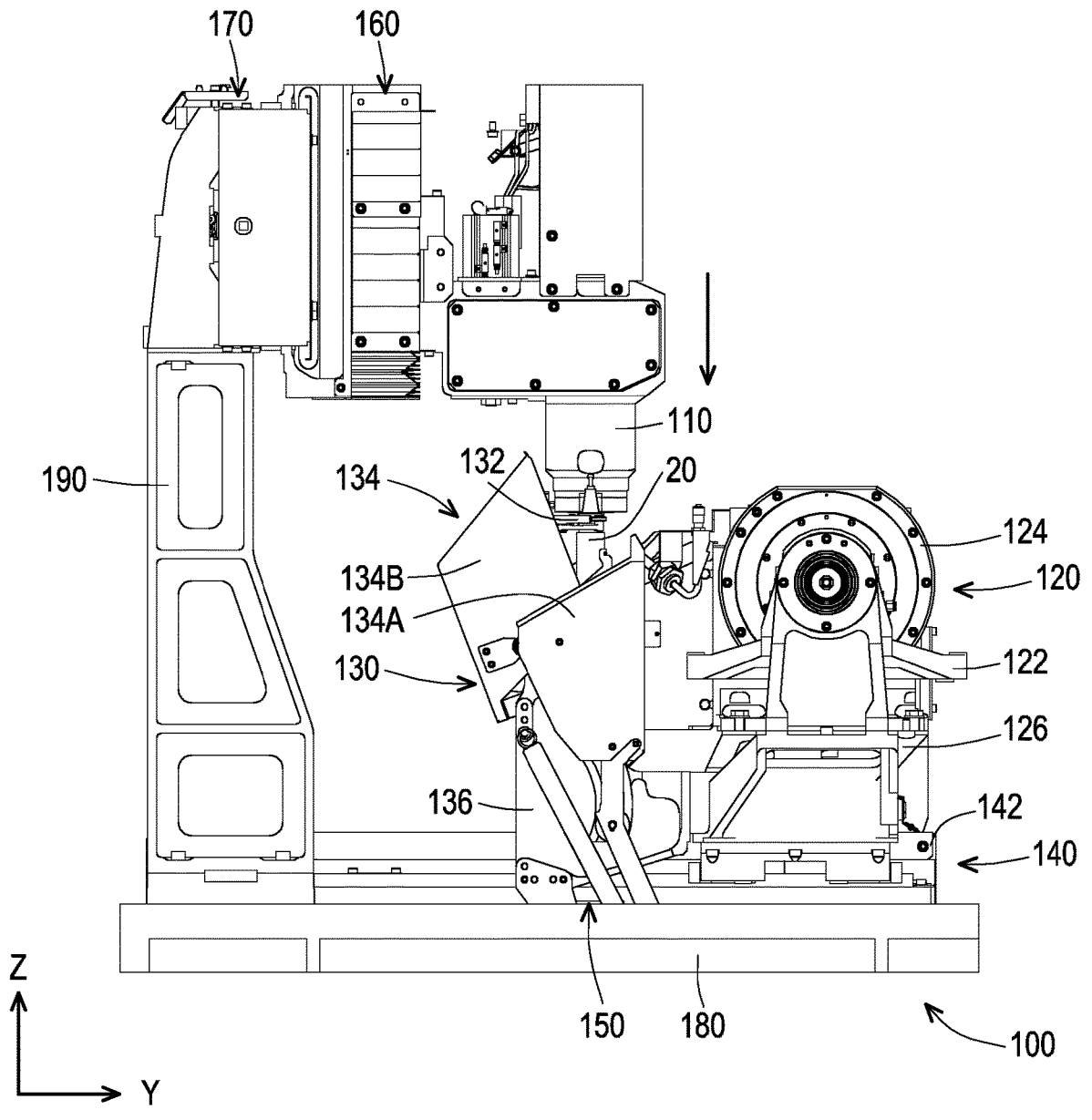
Figure 5H:
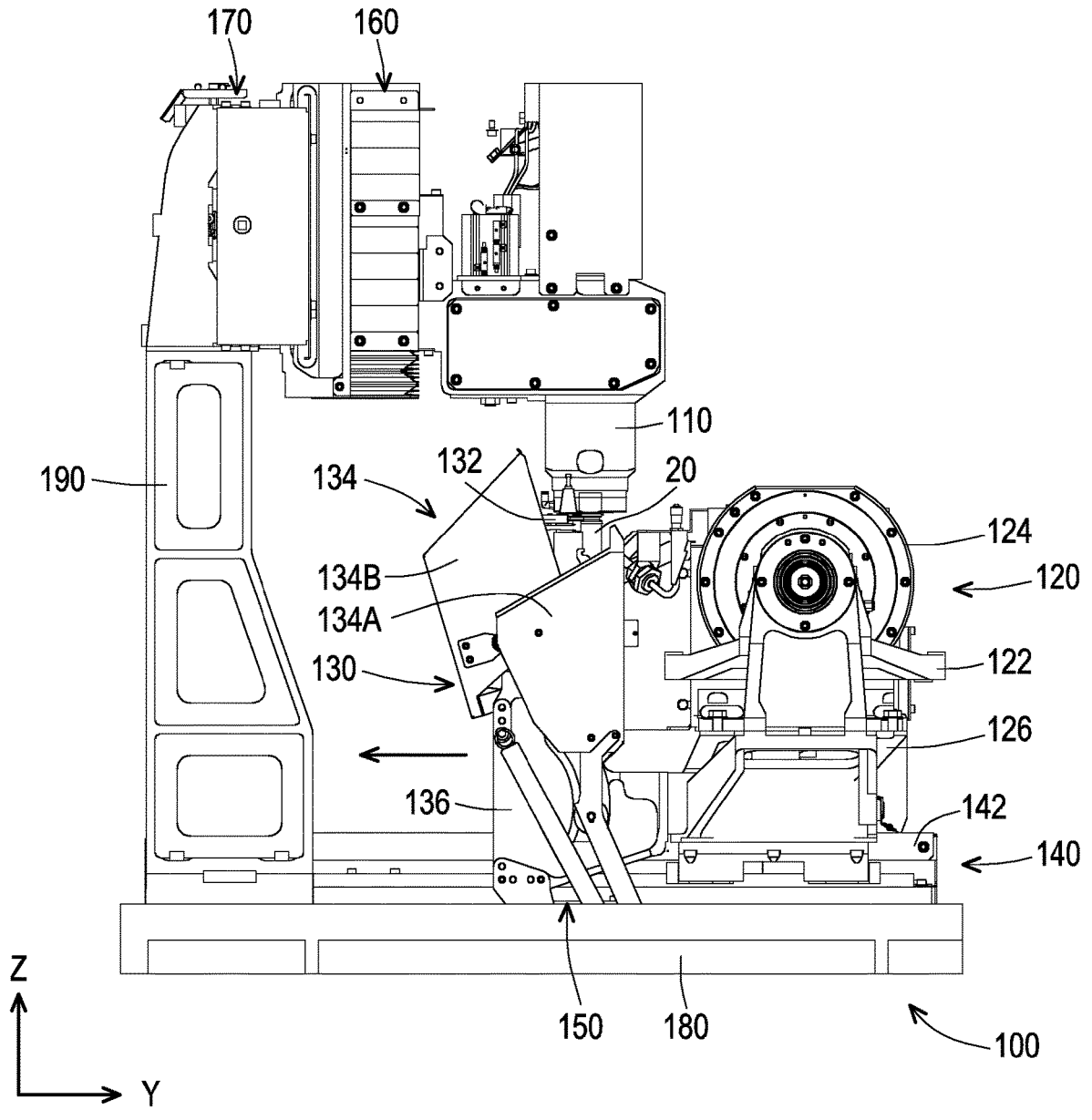
Figure 5I:
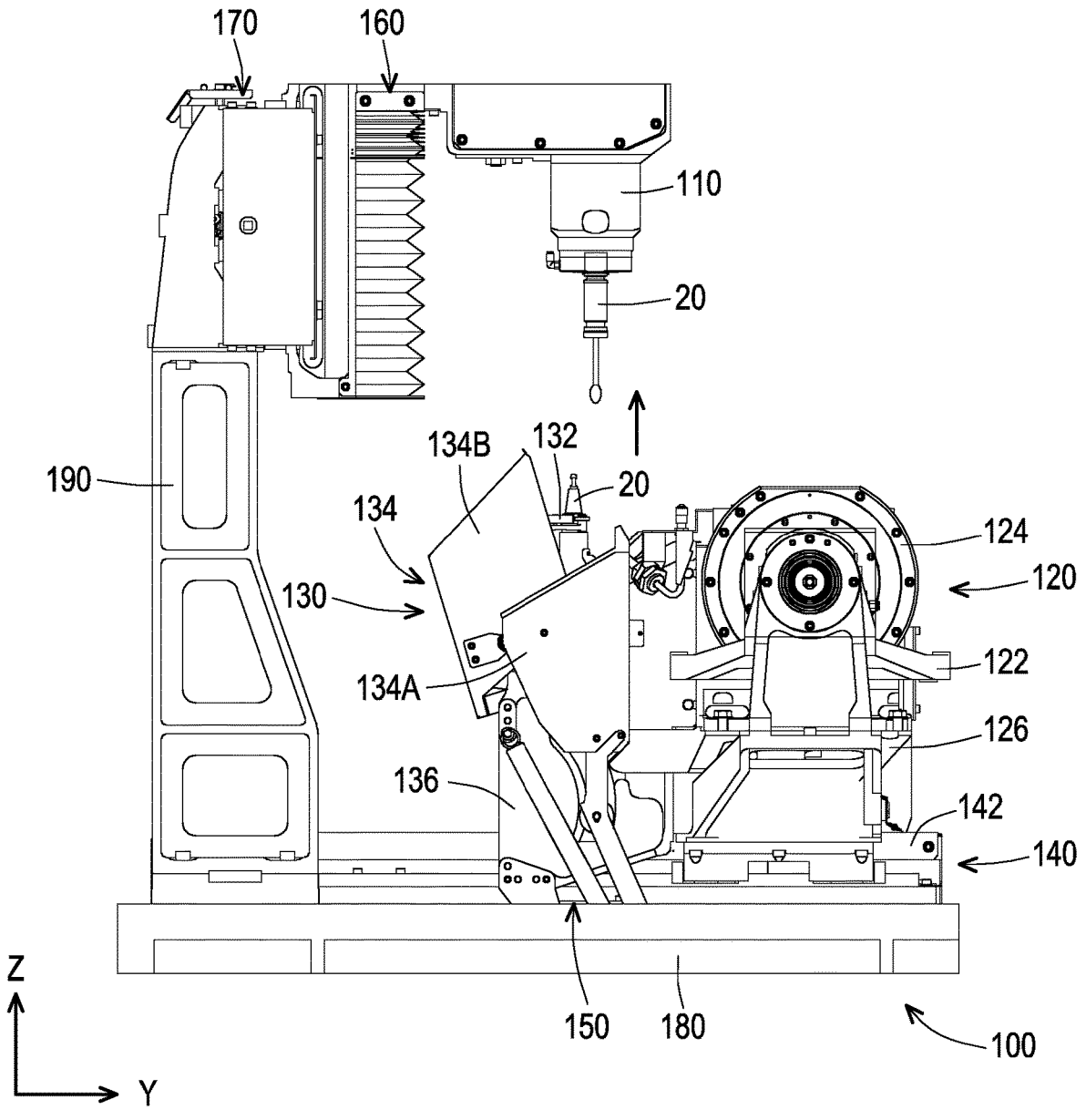
Figure 5J:
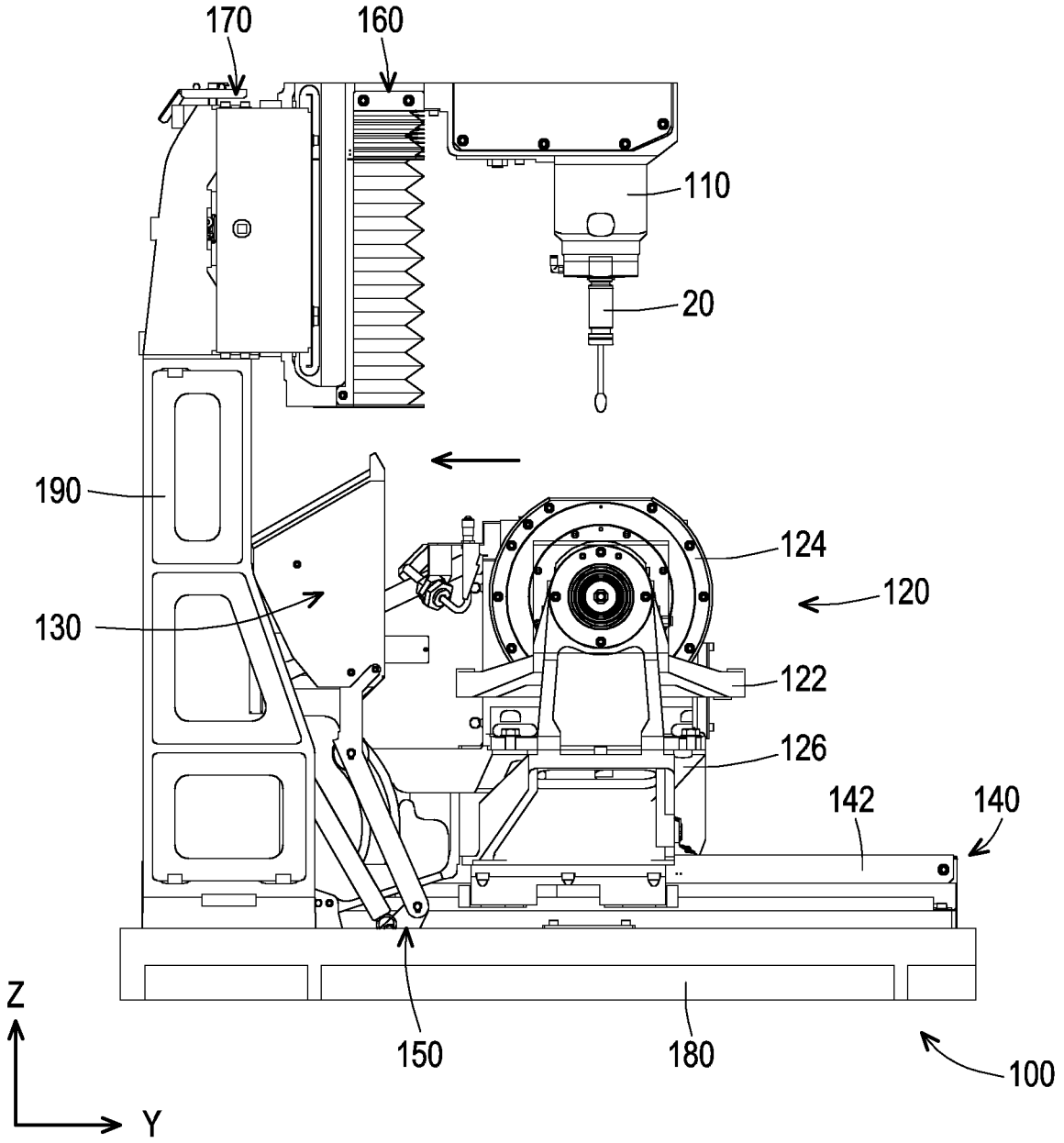

Next, in FIG. 5G, the main shaft 110 is moved downward in the up-down direction Z, as the second direction, by the first driving mechanism 160 to approach the tool holder 132 for the main shaft 110 to hold the next tool 20. Next, in FIG. 5H, the workpiece support part 120 is moved rearward in the front-rear direction Y, as the first direction, by the moving mechanism 140, causing the tool 20 held by the main shaft 110 to move toward the front side of the tool holder 132 and leave the front opening of the clamp 132a of the tool holder 132. As a result, the tool 20 is released from the support of the tool holder 132 and removed from the tool holder 132. Next, in FIG. 5I, the main shaft 110 is moved upward in the up-down direction Z, as the second direction, by the first driving mechanism 160, so that the main shaft 110 leaves the tool magazine 130. Finally, in FIG. 5J, the machine tool 100 completes the tool changing, and the workpiece support part 120 is moved rearward in the front-rear direction Y, as the first direction, by the moving mechanism 140, so that the workpiece support part 120 is moved toward the processing position and located directly below the main shaft 110 for the next processing. Meanwhile, the magazine cover 134 is displaced from the open state to the closed state to cover the tools 20 supported on the tool holder 132 as the tool magazine 130 moves. Nevertheless, the above is merely one example of the tool changing for the machine tool 100 of the disclosure. Each step may be adjusted as required (for example, the specific structure and relative position of each component of the machine tool 100), and the disclosure is not limited thereto.

Figure 6:
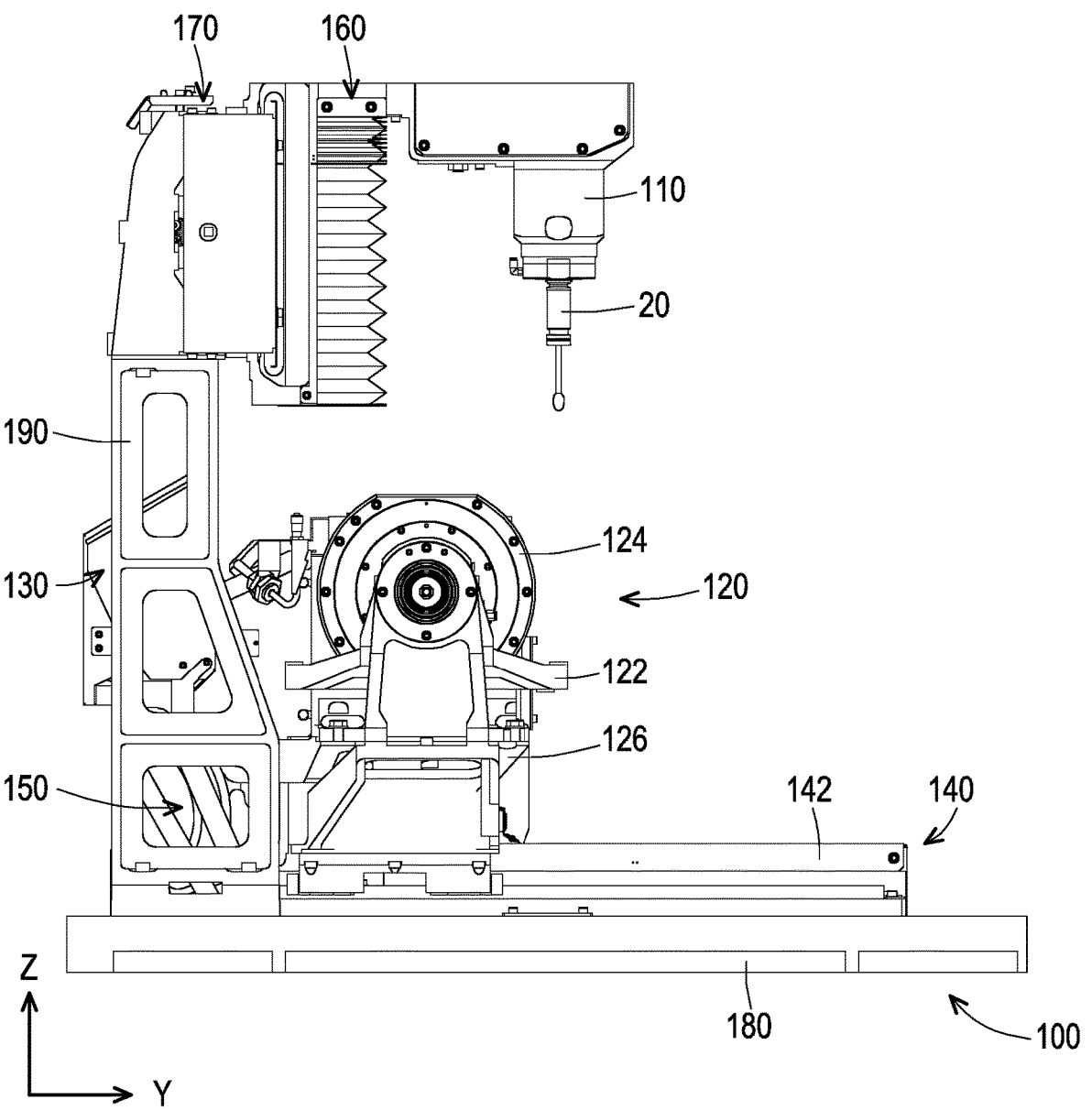
FIG. 6 is a schematic view showing the operation of moving the tool magazine in the direction further away from the processing area during processing of the machine tool shown in FIG. 1.

In this embodiment, the machine tool 100 further includes two columns 190. The columns 190 support the main shaft 110 and are spaced apart by a space in the second direction (for example, left-right direction X) orthogonal to the first direction (front-rear direction Y). For example, the two columns 190 are provided on the base 180 with a space therebetween in the second direction (for example, left-right direction X), and support the main shaft 110 above the base 180. The first driving mechanism 160 and the second driving mechanism 170 for moving the main shaft 110 may also be supported above the base 180 by the two columns 190, but the disclosure is not limited thereto. In addition, the tool magazine 130 is allowed to pass between the two columns 190. That is, the space between the two columns 190 in the left-right direction X is greater than the size of the tool magazine 130 in the left-right direction X, and the moving range of the tool magazine 130 in the first direction (front-rear direction Y) goes through between the two columns 190, which puts the moving range of the tool magazine 130 through the main structure of the machine tool 100 and makes it possible to reduce the size of the machine tool 100 in the first direction (front-rear direction Y). Accordingly, as shown in FIG. 6, the machine tool 100 may move the tool magazine 130 in a direction further away from the processing area (for example, toward the rear) during the processing, so that the workpiece support part 120 has a larger processing area in the first direction. Since the tool magazine 130 is allowed to pass between the two columns 190, even if the tool magazine 130 is disposed far away from the workpiece support part 120 and the moving range of the tool magazine 130 increases, there is no need to increase the size of the machine tool 100 in the first direction. Therefore, the size of the structure is minimized. In other embodiments not shown here, the main shaft 110 may be supported by other structures (for example, a single column extending in the up-down direction Z). The disclosure is not intended to limit the specific structure and number of the columns 190, which may be adjusted as required.

To sum up, in the machine tool according to the disclosure, the operation of opening and closing the magazine cover is linked with the movement of the tool magazine driven by the workpiece support part, and the link mechanism connected to the magazine cover abuts the first cam during the movement of the tool magazine, thereby displacing the magazine cover from the closed state to the open state through the guidance of the first cam on the link mechanism. Thus, the moving speed and moving range of the tool magazine may be designed according to the shape and position of the first cam, which eliminates the need to excessively reduce the moving speed of the tool magazine. Although examples of various mechanisms and components of the machine tool have been described above, the disclosure is not limited thereto. According to the above, the tool changing efficiency of the machine tool of the disclosure can be improved.

It should be noted that the above embodiments are intended to exemplify rather than limit the technical solutions of the disclosure. Although the disclosure has been described in detail with reference to the embodiments described above, those of ordinary skill in the art should understand that it is possible to modify the technical solutions described in the embodiments, or make equivalent substitutions for some or all of the technical features. Such modifications or substitutions do not cause the essence of the technical solutions to depart from the scope of the disclosure.

What is claimed is:

1. A machine tool, comprising:

a main shaft, adapted to hold a tool;

a workpiece support part, adapted to support a workpiece that is processed by the tool being held on the main shaft;

a tool magazine, provided on the workpiece support part, the tool magazine comprising:

a tool holder, adapted to support a plurality of tools; and a magazine cover, covering a periphery of the tool holder, the magazine cover being configured to be openable and closable;

a moving mechanism, comprising a motor, configured to move the workpiece support part in a first direction; and an opening-closing mechanism, configured to open and close the magazine cover, the opening-closing mechanism comprising:

a first cam; and a link mechanism, connected to the magazine cover, wherein when the workpiece support part is moved by the moving mechanism, the link mechanism is configured to displace the magazine cover from a closed state to an open state when the link mechanism abuts the first cam.

2. The machine tool according to claim 1, wherein a position of the first cam in the first direction is overlapped with a moving range of the workpiece support part.

3. The machine tool according to claim 2, further comprising a base supporting the workpiece support part, wherein the first cam is located on the base.

4. The machine tool according to claim 1, wherein the first direction is a front-rear direction, and the tool magazine is disposed at a rear side of the workpiece support part.

5. The machine tool according to claim 1, wherein the magazine cover comprises a first cover, and the link mechanism comprises:

a rotating link, comprising a first contact part, having a first surface, configured to abut the first cam, the rotating link being configured to rotate by contact between the first cam and the first contact part;

a link arm, connected to the rotating link and the first cover, the link arm being configured to displace the first cover to the open state by rotation of the rotating link.

6. The machine tool according to claim 5, wherein an upper end portion of the first cover includes an inclined surface that is inclined downward in a direction approaching the workpiece support part.

7. The machine tool according to claim 5, wherein the magazine cover further includes a second cover facing the first cover, the opening-closing mechanism further comprises:

a second cam, located on the first cover; and a second contact part, comprising a second surface, located on the second cover, the second contact part abutting the second cam, wherein when the first cover is displaced to the open state by the link arm, the second cover is displaced to the open state by the second cam moving in a state of abutting the second contact part.

8. The machine tool according to claim 7, wherein the opening-closing mechanism further comprises:

a first urging part, connected to the link mechanism, the first urging part urging the first cover toward the closed state; and a second urging part, connected to the second cover, the second urging part urging the second cover toward the closed state.

9. The machine tool according to claim 7, wherein in the closed state of the magazine cover, an upper end of the first cover is located above the second cover.

10. The machine tool according to claim 7, wherein an upper end portion of the second cover includes an inclined surface that is inclined downward in a direction away from the first cover.

11. The machine tool according to claim 7, wherein the first direction is a front-rear direction, the first cover covers at least a front and a side with respect to the tool holder, the second cover covers at least a top and a rear with respect to the tool holder.

12. The machine tool according to claim 11, wherein the first cover includes a cover part covering a top of the second cam.

13. The machine tool according to claim 7, wherein the tool magazine further comprises a support member, supporting the tool holder, and the opening-closing mechanism further comprises:

a guide cam, located on the support member and guiding a movement of the link arm, and a third contact part, comprising a third surface, located on the link arm, the third contact part abutting the guide cam.

14. The machine tool according to claim 13, wherein when the first cover is displaced from the closed state to the open state, the first cover moves downward along the guide cam while maintaining an angle of the first cover.

15. The machine tool according to claim 13, wherein the first contact part, the second contact part and the third contact part are each a roller.

16. The machine tool according to claim 13, wherein each of a first cam surface of the first cam, a second cam surface of the second cam, and a third cam surface of the guide cam is a surface facing a direction away from the workpiece support part.

17. The machine tool according to claim 13, wherein the rotating link rotates with respect to the support member about a first axis, and the second cover rotates with respect to the support member about a second axis.

18. The machine tool according to claim 1, wherein the workpiece support part comprises:

a table, adapted to fix the workpiece; and a rotation mechanism, comprising a motor, configured to rotate the table around a rotation axis that is parallel to a horizontal direction.

19. The machine tool according to claim 1, wherein the main shaft is configured to move in a second direction orthogonal to the first direction.

20. The machine tool according to claim 1, further comprising:

two columns, spaced apart by a space in a second direction orthogonal to the first direction, the two columns supporting the main shaft, wherein the tool magazine is configured to pass between the two columns.

\* \* \* \* \*